US012469186B2

(12) United States Patent
Dehghani et al.

(10) Patent No.: US 12,469,186 B2
(45) Date of Patent: Nov. 11, 2025

(54) SYSTEMS AND METHODS FOR GENERATING MULTIMODAL DATA USING A SINGLE-TOWER ARCHITECTURE WITH A DATA GENERATION SUBSYSTEM

(71) Applicant: GDM Holding LLC, Mountain View, CA (US)

(72) Inventors: Mostafa Dehghani, Amsterdam (NL); Phillip Lippe, Amsterdam (NL); Emiel Hoogeboom, Amsterdam (NL); Jonathan Heek, Hilversum (NL)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/193,787

(22) Filed: Apr. 29, 2025

(65) Prior Publication Data

US 2025/0336101 A1    Oct. 30, 2025

Related U.S. Application Data

(60) Provisional application No. 63/640,140, filed on Apr. 29, 2024.

(51) Int. Cl.
*G06N 20/00* (2019.01)
*G06F 40/284* (2020.01)
(Continued)

(52) U.S. Cl.
CPC ............ *G06T 11/00* (2013.01); *G06F 40/284* (2020.01); *G06F 40/40* (2020.01); *G06V 10/774* (2022.01);
(Continued)

(58) Field of Classification Search
CPC ....... G06N 20/00; G06F 40/40; G06F 40/284; G06V 30/19147
See application file for complete search history.

(56) References Cited

U.S. PATENT DOCUMENTS

| 2023/0237772 A1* | 7/2023 | Li ................. G06V 10/803 382/176 |
| 2023/0262293 A1* | 8/2023 | Barbieri ........ H04N 21/47205 715/716 |

(Continued)

OTHER PUBLICATIONS

Achiam et al., "GPT-4 Technical Report," CoRR, Mar. 15, 2023, arxiv.org/abs/2303.08774, 100 pages.
(Continued)

*Primary Examiner* — Yi Yang
(74) *Attorney, Agent, or Firm* — Fish & Richardson P.C.

(57) ABSTRACT

A computer-implemented method of generating multimodal data. The method comprises using a token generation neural network to generate, autoregressively, an output sequence of multimodal tokens, and in response to a next multimodal token being a start-of-image token, generating an image using an image generation subsystem conditioned on features representing the current sequence of multimodal tokens obtained from the token generation neural network. The method further comprises processing the image to convert pixels of the image into a sequence of image tokens, each image token comprising a block encoding of values of the pixels in a different region of the image that maps a set of values of the pixels to a respective image token, and appending the sequence of image tokens to the current output sequence of multimodal tokens as the next multimodal tokens in the output sequence of multimodal tokens.

25 Claims, 6 Drawing Sheets

(51) Int. Cl.
| | |
|---|---|
| G06F 40/40 | (2020.01) |
| G06T 11/00 | (2006.01) |
| G06V 10/774 | (2022.01) |
| G06V 10/82 | (2022.01) |
| G06V 30/19 | (2022.01) |
| G10L 25/18 | (2013.01) |
| G10L 25/30 | (2013.01) |

(52) U.S. Cl.
CPC ........ *G06V 10/82* (2022.01); *G06V 30/19147* (2022.01); *G10L 25/18* (2013.01); *G10L 25/30* (2013.01)

(56) References Cited

U.S. PATENT DOCUMENTS

| | | | | |
|---|---|---|---|---|
| 2023/0419551 | A1* | 12/2023 | Harikumar | G06T 9/008 |
| 2024/0029411 | A1* | 1/2024 | Edraki | G06V 10/774 |
| 2024/0311652 | A1* | 9/2024 | Kulkarni | G06N 3/045 |
| 2024/0320529 | A1* | 9/2024 | Dathathri | G06N 3/045 |

OTHER PUBLICATIONS

Adept.ai [online], "Adept Fuyu-Heavy: A new multimodal model," Jan. 24, 2024, retrieved on May 5, 2025, retrieved from URL <https://www.adept.ai/blog/adept-fuyu-heavy>, 8 pages.
Adept.ai [online], "Fuyu-8B: A Multimodal Architecture for AI Agents," Oct. 17, 2023, retrieved on May 9, 2025, retrieved from URL <https://www.adept.ai/blog/fuyu-8b>, 17 pages.
Aghajanyan et al., "CM3: A Causal Masked Multimodal Model of the Internet," CoRR, Jan. 19, 2022, arXiv:2201.07520, 20 pages.
Aghajanyan et al., "Scaling laws for generative mixed-modal language models," CoRR, Jan. 10, 2023, arXiv:2301.03728, 19 pages.
Ahuja et al., "Megaverse: Benchmarking Large Language Models Across Languages, Modalities, Models and Tasks," CoRR, Nov. 13, 2023, arXiv:2311.07463, 40 pages.
Aiello et al., "Jointly Training Large Autoregressive Multimodal Models," CoRR, Sep. 27, 2023, arXiv:2309.15564, 21 pages.
Alabdulmohsin et al., "Fractal Patterns May Unravel the Intelligence in Next-Token Prediction," CoRR, Feb. 2, 2024, arXiv:2402.01825, 17 pages.
Alayrac et al., "Flamingo: a visual language model for few-shot learning," Advances in Neural Information Processing Systems 35 (NeurIPS 2022) Main Conference Track, 2022, 21 pages.
An et al., "Open-LEAF: Open-Domain Interleaved Image-Text Generation and Evaluation," CoRR, Oct. 11, 2023, arXiv:2310.07749, 19 pages.
Anil et al., "Gemini: A Family of Highly Capable Multimodal Models," CoRR, Dec. 19, 2023, arxiv.org/abs/2312.11805, 90 pages.
Anil et al., "Palm 2 technical report," CoRR, May 17, 2023, arXiv:2305.10403, 93 pages.
Bao et al., "VL-BEiT: Generative vision-language pretraining," CoRR, Jun. 2, 2022, arXiv:2206.01127, 12 pages.
Bar-Tal et al., "Lumiere: A Space-Time Diffusion Model for Video Generation," CoRR, Jan. 23, 2024, arXiv:2401.12945, 20 pages.
Betker et al., "Improving Image Generation with Better Captions," Computer Science, OpenAI Papers, 2(3):8.
Brooks et al., "InstructPix2Pix: Learning to follow image editing instructions," Proceedings of the IEEE/CVF Conference on Computer Vision and Pattern Recognition (CVPR), 2023, pp. 18392-18402.
Brown et al., "Language Models are Few-Shot Learners," Advances in Neural Information Processing Systems 33 (NeurIPS 2020), 2020, 25 pages.
Chen et al., "Generative Pretraining From Pixels," Proceedings of the 37th International Conference on Machine Learning, 2020, 119:1691-1703.
Chen et al., "PaLI: A Jointly-Scaled Multilingual Language-Image Model," The Eleventh International Conference on Learning Representations, Feb. 1, 2023, 33 pages.
Chen et al., "UNITER: Universal image-text representation learning," Computer Vision—ECCV 2020, Sep. 24, 2020, pp. 104-102.
Chen, et al., "PaLI-X: On Scaling up a Multilingual Vision and Language Model," CORR, May 29, 2023, arXiv:2305.18565v1, 30 pages.
Conneau et al., "Unsupervised Cross-lingual Representation Learning at Scale," Proceedings of the 58th Annual Meeting of the Association for Computational Linguistics, Jul. 2020, pp. 8440-8451.
Dai et al., "InstructBLIP: Towards General-purpose Vision-Language Models with Instruction Tuning," CoRR, May 11, 2023, arXiv:2305.06500, 17 pages.
Dehghani et al., "Scaling Vision Transformers to 22 Billion Parameters," Proceedings of the 40th International Conference on Machine Learning, 2023, 202:7480-7512.
Deng et al., "ImageNet: A large-scale hierarchical image database," 2009 IEEE Conference on Computer Vision and Pattern Recognition, Jun. 20-25, 2009, pp. 248-255.
Ding et al., "CogView: Mastering Text-to-Image Generation via Transformers," Advances in Neural Information Processing Systems 34 (NeurIPS 2021), 14 pages.
Dosovitskiy et al., "An Image is Worth 16x16Words: Transformers for Image Recognition at Scale," International Conference on Learning Representations, Jan. 12, 2021, 21 pages.
Ebert et al., "Bridge Data: Boosting Generalization of Robotic Skills with Cross-Domain Datasets," CoRR, Sep. 27, 2021, arXiv:2109.13396, 7 pages.
El-Nouby et al., "Scalable Pre-training of Large Autoregressive Image Models," CoRR, Jan. 16, 2024, arXiv:2401.08541, 14 pages.
Esser et al., "ImageBART: Bidirectional Context with Multinomial Diffusion for Autoregressive Image Synthesis," Advances in Neural Information Processing Systems 34 (NeurIPS 2021), 15 pages.
Esser et al., "Taming transformers for high-resolution image synthesis," Proceedings of the IEEE/CVF Conference on Computer Vision and Pattern Recognition (CVPR), 2021, pp. 12873-12883.
Gadre et al., "DataComp: In search of the next generation of multimodal datasets," 37th Conference on Neural Information Processing Systems (NeurIPS 2023), Track on Datasets and Benchmark, 2023, 21 pages.
Gafni et al., "Make-A-Scene: Scene-based text-to-image generation with human priors," European Conference on Computer Vision, Oct. 31, 2022, pp. 89-106.
Gemmeke et al., "Audio set: An ontology and human-labeled dataset for audio events," 2017 IEEE International Conference on Acoustics, Speech and Signal Processing (ICASSP), Mar. 5-9, 2017, pp. 776-780.
Goyal et al., "Larger-Scale Transformers for Multilingual Masked Language Modeling," Proceedings of the 6th Workshop on Representation Learning for NLP (RepL4NLP-2021), Aug. 2021, pp. 29-33.
Gu et al., "Vector Quantized Diffusion Model for Text-to-Image Synthesis," Proceedings of the IEEE/CVF Conference on Computer Vision and Pattern Recognition (CVPR), Jun. 2022, pp. 10696-10706.
Hashimoto, "Model Performance Scaling with Multiple Data Sources," Proceedings of the 38th International Conference on Machine Learning, Jul. 18-24, 2021, 139:4107-4116.
He et al., "Deep residual learning for image recognition," Proceedings of the IEEE Conference on Computer Vision and Pattern Recognition (CVPR), 2016, pp. 770-778.
Ho et al., "Classifier-Free Diffusion Guidance," CoRR, Jul. 26, 2022, arXiv:2207.12598, 14 pages.
Ho et al., "Denoising Diffusion Probabilistic Models," CoRR, Jun. 19, 2020, arXiv:2006:11239, 25 pages.
Hoffmann et al., "Training compute-optimal large language models," CoRR, Mar. 29, 2022, arXiv:2203.15556, 36 pages.
Hoogeboom et al., "Simple Diffusion: End-to-End Diffusion for High Resolution Images," Proceedings of the 40th International Conference on Machine Learning, 2023, 202:13213-13232.
Huang et al., "Modality Competition: What Makes Joint Training of Multi-modal Network Fail in Deep Learning? (Provably)," Proceedings of the 39th International Conference on Machine Learning, Jul. 17-23, 162:9226-9259.

(56) References Cited

OTHER PUBLICATIONS

Huang et al., "Not All Image Regions Matter: Masked Vector Quantization for Autoregressive Image Generation," Proceedings of the IEEE/CVF Conference on Computer Vision and Pattern Recognition (CVPR), 2023, pp. 2002-2011.

Huang et al., "Towards Accurate Image Coding: Improved Autoregressive Image Generation with Dynamic Vector Quantization," Proceedings of the IEEE/CVF Conference on Computer Vision and Pattern Recognition (CVPR), 2023, pp. 22596-22605.

Jain et al., "A Data-Based Perspective on Transfer Learning," Proceedings of the IEEE/CVF Conference on Computer Vision and Pattern Recognition (CVPR), Jun. 2023, pp. 3613-3622.

Jia et al., "Scaling up visual and vision-language representation learning with noisy text supervision," Proceedings of the 38th International Conference on Machine Learning, 2021, 139:4904-4916.

Jiang et al., "Mixtral of experts," CoRR, Jan. 8, 2024, arXiv:2401.04088, 13 pages.

Kaplan et al., "Scaling laws for neural language models," CoRR, Jan. 23, 2020, arXiv:2001.08361, 30 pages.

Karras et al., "Analyzing and Improving the Training Dynamics of Diffusion Models," CoRR, Dec. 5, 2023, arXiv:2312.02696, 39 pages.

Kay et al., "The Kinetics Human Action Video Dataset," CoRR, May 19, 2017, arXiv:1705.06950, 22 pages.

Kim et al., "ViLT: Vision-and-Language Transformer Without Convolution or Region Supervision," Proceedings of the 38th International Conference on Machine Learning, 2021, 139:5583-5594.

Krishna et al., "Visual Genome: Connecting Language and Vision Using Crowdsourced Dense Image Annotations," CoRR, Feb. 23, 2016, arXiv:1602.07332, 44 pages.

Kuznetsova et al., "The Open Images Dataset V4: Unified image classification, object detection, and visual relationship detection at scale," CoRR, Nov. 2, 2018, arXiv:1811.00982, 26 pages.

Laurençon et al., "OBELICS: An open web-scale filtered dataset of interleaved image-text documents," CoRR, Jun. 21, 2023, arXiv:2306.16527, 51 pages.

Li et al., "Align before Fuse: Vision and Language Representation Learning with Momentum Distillation," Advances in Neural Information Processing Systems 34 (NeurIPS 2021), 2021, 12 pages.

Li et al., "BLIP: Bootstrapping language-image pre-training for unified vision-language understanding and generation," Proceedings of the 39th International Conference on Machine Learning, 2022, 162:12888-12900.

Li et al., "Denoising Autoregressive Representation Learning," CoRR, Mar. 8, 2024, arXiv:2403.05196, 22 pages.

Li et al., "Fine-Grained Semantically Aligned Vision-Language Pre-Training," Advances in Neural Information Processing Systems 35 (NeurIPS 2022), Main Conference Track, 2022, 14 pages.

Li et al., "Oscar: Object-semantics aligned pre-training for vision language tasks," Computer Vision—ECCV 2020: 16th European Conference, Glasgow, UK, Aug. 23-28, 2020, 21 pages.

Mizrahi et al., "4M: Massively Multimodal Masked Modeling," CoRR, Dec. 11, 2023, arXiv:2312.06647, 46 pages.

OpenAI "GPT-4V(ision) System Card," Computer Science, Engineering, Sep. 25, 2023, 18 pages.

Ordonez et al., "Im2Text: Describing Images Using 1 Million Captioned Photographs," Advances in Neural Information Processing Systems 24 (NIPS 2011), 2011, 9 pages.

Parkhi et al., "Cats and Dogs," 2012 IEEE Conference on Computer Vision and Pattern Recognition, Jun. 16-21, 2012, pp. 3498-3505.

Radford et al., "Learning Transferable Visual Models From Natural Language Supervision," Proceedings of the 38th International Conference on Machine Learning, 2021, 139:8748-8763.

Raffel et al., "Exploring the Limits of Transfer Learning with a Unified Text-to-Text Transformer," CoRR, Oct. 23, 2019, https://arxiv.org/abs/1910.10683, 67 pages.

Ramesh et al., "Zero-Shot Text-to-Image Generation," Proceedings of the 38th International Conference on Machine Learning, 2021, 139:8821-8831.

Razavi et al., "Generating diverse high-fidelity images with VQ-VAE-2," Advances in neural information processing systems (NeurIPS 2019), 2019, 11 pages.

Rombach et al., "High-Resolution Image Synthesis With Latent Diffusion Models," CoRR, Dec. 20, 2021, arXiv:2112.10752, 45 pages.

Ronneberger et al., "U-Net: Convolutional Networks for Biomedical Image Segmentation," CoRR, May 18, 2015, arXiv:1505.04597, 8 pages.

Ruhu et al., "Rolling Diffusion Models," CoRR, Feb. 12, 2024, arXiv:2402.09470, 18 pages.

Saharia et al., "Photorealistic text-to-image diffusion models with deep language understanding," Advances in Neural Information Processing Systems 35 (NeurIPS 2022), 2022, 16 pages.

Schuhmann et al., "LAION-400M: Open dataset of clip-filtered 400 million image-text pairs," CoRR, Nov. 3, 2021, arXiv:2111.02114, 5 pages.

Shao et al., "Objects365: A large-scale, high-quality dataset for object detection," IEEE/CVF international conference on computer vision, 2019, pp. 8430-8439.

Sharma, et al., "Conceptual Captions: A Cleaned, Hypernymed, Image A lt-text Dataset for Automatic Image Captioning," Proceedings of the 56th Annual Meeting of the Association for Computational Linguistics (vol. 1: Long Papers), Jul. 2018, Melbourne, Australia, pp. 2556-2565.

Sohl-Dickstein et al., "Deep Unsupervised Learning using Nonequilibrium Thermodynamics," Proceedings of the 32nd International Conference on Machine Learning, Jul. 7-9, 2015, 37:2256-2265.

Tian et al., "MM-Interleaved: Interleaved Image-Text Generative Modeling via Multi-modal Feature Synchronizer," CoRR, Jan. 18, 2024, arXiv:2401.10208, 35 pages.

Tong et al., "Eyes Wide Shut? Exploring the Visual Shortcomings of Multimodal LLMs," CoRR, Jan. 11, 2024, arxiv.org/abs/2401.06209, 18 pages.

Touvron et al., "Llama 2: Open foundation and fine-tuned chat models," CoRR, Jul. 18, 2023, arXiv:2307.09288, 77 pages.

Tschannen et al., "GIVT: Generative Infinite-Vocabulary Transformers," CoRR, Dec. 4, 2023, arXiv:2312.02116, 32 pages.

Tschannen et al., "Image Captioners Are Scalable Vision Learners Too," Thirty-seventh Conference on Neural Information Processing Systems, Sep. 21, 2023, 26 pages.

Van den Oord et al., "Neural discrete representation learning," Advances in Neural Information Processing Systems 30, 2017, 10 pages.

Vaswani et al., "Attention Is All You Need," CoRR, Jun. 12, 2017, arXiv:1706.0372, 15 pages.

Wang et al., "GIT: A Generative Image-to-text Transformer for Vision and Language," Transactions on Machine Learning Research, Dec. 12, 2022, 18 pages.

Wang et al., "Mementos: A Comprehensive Benchmark for Multimodal Large Language Model Reasoning over Image Sequences," CoRR, Jan. 19, 2024, arXiv:2401.10529, 27 pages.

Wang et al., "On Negative Interference in Multilingual Models: Findings and A Meta-Learning Treatment," Proceedings of the 2020 Conference on Empirical Methods in Natural Language Processing (EMNLP), Nov. 2020, pp. 4438-4450.

Yu et al., "CoCa: Contrastive Captioners are Image-Text Foundation Models," Transactions on Machine Learning Research, Aug. 26, 2022, 20 pages.

Yu et al., "Scaling Autoregressive Models for Content-Rich Text-to-Image Generation," Transactions on Machine Learning Research, Nov. 7, 2022, 53 pages.

Yu et al., "Scaling autoregressive multi-modal models: Pretraining and instruction tuning," CoRR, Sep. 5, 2023, arXiv:2309.02591, 19 pages.

Yu et al., "Vector-quantized Image Modeling with Improved VQGAN," International Conference on Learning Representations, Jan. 28, 2022, 17 pages.

Zhai et al., "LiT: Zero-Shot Transfer with Locked-image Text Tuning," Proceedings of the IEEE/CVF Conference on Computer Vision and Pattern Recognition (CVPR), 2022, pp. 18123-18133.

(56) References Cited

OTHER PUBLICATIONS

Zhai et al., "Sigmoid Loss for Language Image Pre-Training," Proceedings of the IEEE/CVF International Conference on Computer Vision (ICCV), 2023, pp. 11975-11986.

Zhan et al., "Multimodal image synthesis and editing: A survey and taxonomy," IEEE Transactions on Pattern Analysis and Machine Intelligence, Nov. 3, 2023, 45(12):15098-15119.

Zhao et al., "Blessing of Class Diversity in Pre-training," Proceedings of The 26th International Conference on Artificial Intelligence and Statistics, 2023, 206:283-305.

* cited by examiner

SYSTEMS AND METHODS FOR GENERATING MULTIMODAL DATA USING A SINGLE-TOWER ARCHITECTURE WITH A DATA GENERATION SUBSYSTEM

CROSS-REFERENCE TO RELATED APPLICATION

This application claims priority to U.S. Provisional Application No. 63/640,140, filed on Apr. 29, 2024. The disclosure of the prior application is considered part of and is incorporated by reference in the disclosure of this application.

BACKGROUND

This specification relates to processing data using machine learning models.

Machine learning models receive an input and generate an output, e.g., a predicted output, based on the received input.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a method, implemented as a computer program on one or more computers in one or more locations, for generating multimodal data. A method of training a system for generating multimodal data items is also described. Corresponding systems are also described. Some implementations of the described techniques address issues of "negative transfer", where training on multiple modalities adversely affects performance on individual modalities.

In a first aspect there is described a computer-implemented method of generating multimodal data using a system. The system includes a token generation neural network and a data, e.g., image, generation subsystem. The data, e.g., image, generation subsystem can comprise an image generation neural network; it can implement a diffusion model.

The method involves receiving a prompt sequence that defines an input sequence of multimodal tokens, and processing the input sequence of multimodal tokens using the token generation neural network to generate an output sequence of multimodal tokens. A multimodal token may represent a data element of one of a plurality of modalities.

Generating the output sequence of multimodal tokens comprises autoregressively, for each successive position in the output sequence of multimodal tokens, processing a combined sequence comprising the input sequence of multimodal tokens and a current output sequence of multimodal tokens, using the token generation neural network, to generate a next multimodal token for the output sequence of multimodal tokens, and appending the next multimodal token to the current output sequence of multimodal tokens.

The method involves, in response to the next multimodal token being a start-of-image token, generating an image, processing the image to convert pixels of the image into a sequence of image tokens, and appending the sequence of image tokens to the current output sequence of multimodal tokens as the next multimodal tokens in the output sequence of multimodal tokens. The image is generated using the image generation subsystem. The image is generated conditioned on features representing the current output sequence of multimodal tokens obtained from the token generation neural network.

In a second aspect there is described a method of training a system for generating multimodal data items. The system comprises a token generation neural network, a data, e.g., image, generation subsystem comprising a data, e.g., image, generation neural network such as a diffusion model neural network. The system may also comprise a block encoder.

The method includes obtaining a set of multimodal training examples, each training example comprising text or audio data and at least one training image.

The method includes, for each training example, generating a corresponding sequence of ground truth multimodal tokens representing the text or audio data and the training image.

Generating the ground truth multimodal tokens representing the training image may include processing the training image using a block encoder to convert pixels of the training image into a sequence of image tokens. Each image token may comprise a block encoding of values of the pixels in a different region, e.g., patch or tile, of the training image that maps a set of values of the pixels to a respective image token.

In some implementations of the system, in training and/or in inference, the block encoder feeds "raw" pixel values from each region into the token generation neural network. That is the block encoding process can simply involve dividing the image or other data item into regions or patches for determining the pixel values in a region or patch that are provided, as one or more tokens, to the token generation neural network. For example, in some implementations a fixed region or patch of the image, i.e., a fixed block of pixels, corresponds to a token and the representation of this token is not dependent on previous parts of the representation of the image. The block encoder can encode regions or pixel blocks independently of other regions or pixel blocks of the image. The encoding can be constant in the sense that the encoding of a particular block of pixel values is always the same (during inference). In some implementations the number of tokens representing an image varies depending on the image size (number of pixels). In some implementations the block encoder can be differentiable; not that this does not preclude a constant encoding (in inference, rather than in training).

The sequence of ground truth tokens includes a start-of-image token. The start-of-image token may be positioned before (e.g., immediately before) a ground truth multimodal token representing the training image. The token representing the training image may be, for example, a token representing a first patch of the training image. Typically, an image patch corresponds to a small area of an image (e.g., pixels in a region of the image). The image can be represented by a number of patches which, in combination, form the entire image.

The method further includes determining a plurality of training sequences. Each training sequence comprises a subsequence of the sequence of ground truth multimodal tokens. In some implementations the subsequence derived from the sequence of ground truth multimodal tokens, i.e., the training sequences, comprise subsequences of a succession of increasing sequence lengths, e.g., from 1 to L, where L is the length of the sequence of ground truth multimodal tokens. Some training sequences end with the start-of-image token.

The method includes, for each training sequence, in response to determining that a last ground truth multimodal token in the subsequence is the start-of-image token, using the image generation subsystem to generate a predicted image conditioned on features representing the subsequence.

The method includes processing the subsequence using the token generation neural network to generate a predicted next multimodal token when the last ground truth multimodal token in the subsequence is not the start-of-image token. The method may include processing the subsequence using the token generation neural network to generate a predicted next multimodal token when the last ground truth multimodal token in the subsequence is the start-of-image token. That is, when the last ground multimodal token in the subsequence is the start-of-image token, the method may include generating a predicted image using the image generation subsystem and processing the subsequence using the token generation neural network to generate a predicted next multimodal token.

The method further includes training the system based on the training examples. The training uses an image reconstruction objective that depends on the predicted image and the training image. The training uses a token prediction objective that depends on the predicted next multimodal token and a next ground truth multimodal token after the subsequence. The training includes updating learnable parameters of the token generation neural network and the image generation neural network. That is, the token generation neural network and the image generation neural network are jointly trained. In implementations wherein the system includes a block encoder, the training may (but need not) further include updating learnable parameters of the block encoder. That is, in such implementations the block encoder may be jointly trained with the token generation neural network and the image generation neural network.

The multimodal training examples may include training examples in which the at least one training image is after the text or audio data. Additionally or alternatively, the multimodal training examples may include training examples in which the at least one training image is before the text or audio data.

Processing the image to convert pixels of the image into a sequence of image tokens may be performed by a block encoder. Each image token may comprise a block encoding of values of the pixels in a different region of the image that maps a set of values of the pixels to a respective image token. In such implementations, the system comprises a block encoder. In general, the block encoder is a differentiable block encoder, i.e., it has learnable parameters that can be updated using a gradient descent optimization algorithm. It can be implemented, e.g., using a neural network.

In some implementations, the block encoder encodes each region or block of the image independently of other regions (blocks) of the image. That is, in implementations an image token is not dependent on previously generated image tokens. In implementations, after training the block encoder implements a deterministic, e.g., constant mapping (encoding), i.e., it consistently maps the same set of values of the pixels of an image region to the same respective image token. In implementations images are mapped into a number of image tokens that is variable and depends upon the image size, i.e., larger images are encoded into more tokens.

In some implementations of the subject matter described herein the image generation subsystem can be used to generate audio (sound), by representing the audio as an image, in particular a spectrogram. In some implementations of the subject matter described herein the image generation subsystem is replaced by an audio generation subsystem that does not rely on an intermediate step of generating an image, in particular an audio generation subsystem comprising an audio generation neural network. For example, the audio generation subsystem may comprise a speech generation subsystem. In general any the audio generation subsystem may be used. In such implementations the image tokens are replaced by audio tokens; these may be generated by an audio block encoder to encode time domain, or time-frequency domain, blocks of audio. Again, after training the audio block encoder can implement a deterministic, e.g., constant mapping (encoding) from an audio block to an audio token. There are many techniques that can be used for audio block encoding; in some implementations a linear audio region encoding neural network is used, in a corresponding manner to the linear image region encoding neural network, i.e., to encode the audio as a linear projection of time or time-frequency domain audio data for a time, or time-frequency region of the audio.

The subject matter described in this specification can be implemented in particular embodiments so as to realize one or more of the following advantages.

Implementations of the described system address the problem of "negative transfer", i.e., in a multimodal model training on multiple modalities, e.g., images as well as text, tends to impact the performance of each modality compared with training on a single modality, e.g., just text. Ideally, training should not hinder the other but rather improve performance of each modality when trained on multiple modalities, so-called "positive transfer".

Some implementations of the described system address this problem by offloading the image generation to a separate model, in implementations a diffusion model, and by encoding the images generated by the model using a block encoding scheme that maps values of the pixels in a region of the image to a set of values of the pixels to a respective image token, in particular using a deterministic, e.g., constant mapping (after training). Each image region is encoded independently and, where the size of an image is variable, so is the number of tokens that it is encoded into. In some implementations images are encoded using a linear encoding scheme, i.e., a linear mapping from pixel values to image token values. Combining these two approaches facilitates generating image detail and retaining this information when processing the multimodal tokens, hence addressing the negative transfer problem. Further, during training, the block encoder can be specifically adapted to the overall model.

The image generated using the described system is generated conditioned on features representing the current output sequence. As such, the image generation can be conditioned based on previously generated images. This can achieve improved consistency for the generation of multiple images. A series of images (e.g., a plurality of images in a set) may be generated which share consistency between each image. For example, if a series of images are generated all representing a particular location, each image within the set may be consistent with other images in the set, for example representing the same time of day, same weather, same subjects (e.g., same person, same classification of object etc.). The subject matter described herein can be used to perform prompt-based image editing, e.g., where a series of output images can be updated based on one or more text prompts.

In general, the system, once trained on a large corpus of data, and even without fine tuning, can perform a wide range of tasks. After the system has been trained it can be deployed for use in performing the task(s). For instance, the system can be deployed in an environment that enables users to provide requests for the system to process specified multimodal inputs to generate corresponding outputs. Users can provide the requests, e.g., by way of a user interface or through an application programming interface (API). The requests can be transmitted from a user device (e.g., over a data communication network, e.g., the internet) to one or more computers implementing the system, e.g., in a data center. The system can process multimodal inputs specified by user requests to generate corresponding outputs, and then transmit the outputs to user devices (e.g., over a data communication network).

In some implementations, after training, a particular task that is to be performed by the system can be described by the prompt to the system. For example, where the prompt includes an image such a prompt might specify "Generate a caption", "Generate a description", "Answer the following question: [about the image or video]", or "Detect a person". Where the system is used for an agent control task a prompt may define "Take the knife out of the drawer", or "Q: What action should the robot take to take the knife out of the drawer?". Also or instead such a prompt may give one or more examples of a task to be performed. The system can be trained on multiple natural and/or computer languages and the prompt may then specify a language to use.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
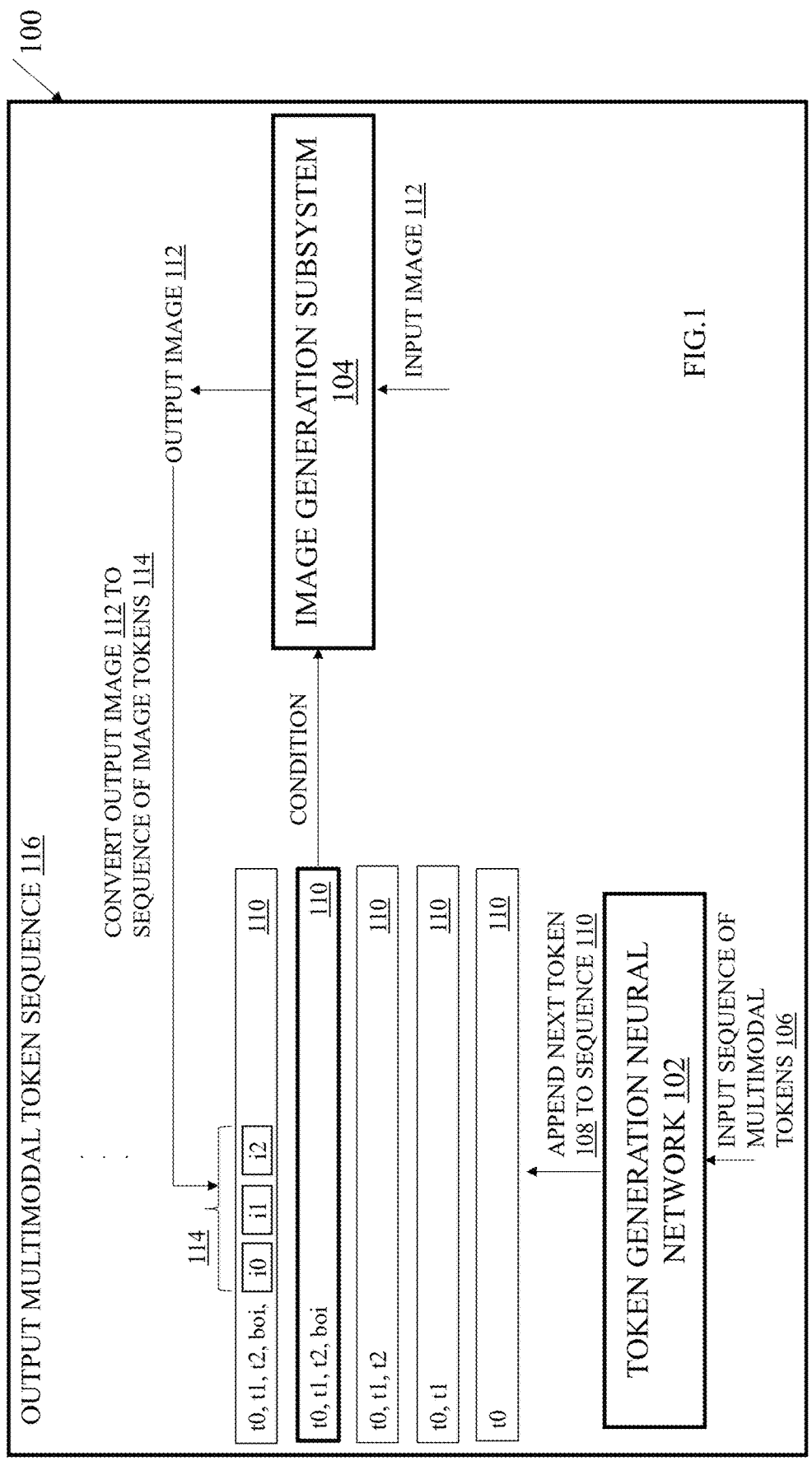
FIG. 1 shows an example system for generating multimodal data.

FIG. 1 shows an example system 100, implemented as computer programs on one or more computers in one or more locations, for generating multimodal data. The system comprises a token generation neural network 102 and data generation subsystem 104, e.g., an image generation subsystem 104 as shown in the example of FIG. 1. Optionally, the system further comprises a block encoder (not shown).

"Modality" as used in this specification refers to a type of data. Multimodal data is data comprising two or more different data types, for example data comprising two or more different data types from the following: text data, audio data such as speech data, in particular data defining an audio waveform, or image data, in particular data defining pixel values for pixels of a still or moving image.

Text data can represent text in a natural or computer language. The text may be received, e.g., as a series of encoded characters, e.g., UTF-8 encoded characters; such "characters" can include Chinese and other similar characters, as well as logograms, syllabograms and the like. The text can be processed to represent the text as a series of text tokens from a vocabulary of text tokens, e.g., that each represent words, wordpieces or characters in a natural or computer language. The computer language may be any formal language used to communicate with a computer, e.g., a markup language, or a command or configuration language, or a data exchange language such as JSON, or a programming language. There are many ways of representing text as a series of text tokens; one way is to use a text tokenizer.

A "token" as used in this specification is a data element, comprising a vector of numerical values and having a specified dimensionality. In general, the image tokens and multimodal tokens may have the same dimensionality. A multimodal token may represent a data element of one of a plurality of modalities (e.g., representing text, an image, audio). For a set of multimodal tokens, each token of the plurality of multimodal tokens may represent data elements of one of a plurality of modalities (e.g., representing text, an image, of audio). As above, in general, each multimodal token may have the same dimensionality. Multimodal tokens may, therefore, refer to a plurality of tokens of a single modality from the plurality of modalities or to a plurality of tokens of two or more modalities from the plurality of modalities.

An image can be a still image or a moving image (e.g., a video), in 2D or 3D. The image may be associated with light in the electromagnetic spectrum, e.g., of optical light, of infrared light, or of ultraviolet light. The image may be monochrome, colour, or hyperspectral image, or a LIDAR image, in which case the "pixels" may comprise points of a point cloud. It is generally represented by values of pixels (more specifically voxels for a 3D image) of the image. The image may also be an audio spectrogram, i.e., an image of a time-frequency representation of the audio.

An image as described herein (whether during training or during inference) may be an image of a real-world environment, e.g., captured from the real-world by a camera or a microphone, or other image or audio sensor. Depending on the type of image captured, objects represented in the image may be physical real-world objects or real-world sounds (e.g., spoken words).

The system 100 is configured to receive a prompt sequence that defines or includes an input sequence of multimodal tokens 106.

The input sequence of multimodal tokens as described herein may comprise multimodal tokens representing a combination of two or more of: text, audio, or image data elements. The text data elements can be, e.g., words or wordpieces as previously described. The audio data elements can represent time segments of audio (e.g., an audio waveform). The image data elements can comprise pixel values for an image or a region (e.g., a patch) of an image. Likewise, the output sequence of multimodal tokens 116 as described herein may comprise multimodal tokens representing a combination of two or more of: text, audio, or image data elements.

In some implementations, the input sequence includes a plurality or multiplicity of tokens of different modalities, which are interleaved with respect to one another. The modalities may be any two or more of: text, audio, and/or image data elements. In general, the number of tokens of each modality may be different and so the interleaving of the tokens of different modality may not be a strict alternation. In more general terms, assuming the modalities of the tokens are type "A" (e.g., representing text) and "B" (e.g., representing an image or audio), the input sequence may alternate between patches or clusters of "A" type tokens and patches or clusters of "B" type tokens. A specific example of an input sequence of multimodal tokens may be "A, A, A, B, B, B, B, A, A, B, B, B, B".

In some implementations, the input sequence includes a "begin of image" or "start of image" (herein "boi") token to mark the beginning of one or more image tokens in the input sequence. In general, the "boi" token also marks or delineates a transition between a token of a first modality to a token of a second, different, modality (e.g., in-between tokens of "A" and "B" type).

In some implementations, the one or more image tokens in the input sequence include "raw" (i.e., unprocessed) pixel patches of an image. The "raw" pixel patches can be assembled together to form an image. This helps to improve inference performance as the one or more images associated with the one or more image tokens are associated with no information loss.

In some implementations, the input sequence includes a "begin of sequence" (herein "bos") token and an "end of sequence" (herein "eos") token to mark the beginning and the end of the sequence, respectively.

In some implementations the token generation neural network adds a token position encoding to each of the multimodal tokens (e.g., audio, image and/or text tokens) in the input sequence. Any appropriate position encoding can be used, e.g., relative position encoding, rotary position encoding (such as RoPE), or absolute position encoding.

The token generation neural network 102 is configured to process the input sequence of multimodal tokens 106 to generate an output sequence of multimodal tokens 116. The modalities of the output sequence may be any two or more of: text, audio, and/or image data elements. Each successive token 108 generated by the token generation neural network is appended to the current output sequence 110 of tokens (which may include multimodal tokens of a different or the same type).

In some implementations, the current output sequence 110 comprises an output token for each position in the output sequence preceding a position of the next multimodal token (e.g., representing text, image, or audio) to be predicted by the token generation neural network in the output sequence.

In some implementations, the token generation neural network 102 generates the output sequence of multimodal tokens by, autoregressively, for each successive position in the output sequence of multimodal tokens: processing a combined sequence comprising the input sequence of multimodal tokens and the current output sequence of tokens.

In some implementations, the token generation neural network 102 autoregressively generates a plurality of text tokens (denoted t0, t1, t2 in FIG. 1) before autoregressively generating a "boi" token. It will be understood that, in some implementations, the first token autoregressively generated by the token generation neural network may be a "boi" token.

The data, e.g., image, generation subsystem 104 is configured to process an input image and generate an output image in response to the token generation neural network autoregressively generating an "boi" token. That is, the image generation subsystem is triggered to generate an output image conditional upon the token generation neural network generating a "boi" token. The output image generated is conditioned on features representing the current output sequence of the tokens obtained from the token generation neural network. Data, e.g., image, generation subsystem 104 can comprise, e.g., a diffusion model or an autoregressive model, conditioned on features representing the current output sequence of the tokens.

In a specific implementation, the features used to condition the image generation subsystem are determined from the output features of the "boi" token, which are used to generate a summary multimodal token. The "boi" token is a convenient choice for generating the summary multimodal token because, as the token generation neural network generates successive tokens autoregressively, it already represents or provides a summary of all preceding tokens generated by the token generation neural network and because it has no target text token to predict. This means that the values for the output features of the "boi" token can be assigned or otherwise processed during training.

Alternative implementations for generating the summary multimodal token are envisaged, e.g., in which all preceding tokens (or all preceding tokens before a start of sentence token) generated by the token generation neural network 102 are used to generate the summary multimodal token. This may involve pooling features (e.g., mean pooling or max pooling) from the output features from the preceding tokens in the current output sequence. In yet further implementations, a combination of pooled features and the features derived from the "boi" token can be used for generating the summary multimodal token for conditioning the image generation.

In some implementations, the system is configured to process the image generated by the image generation subsystem 104 to convert pixels of the image into a sequence of image tokens 114. Each image token may comprise a block encoding of values of the pixels in a different region of the image that maps a set of values of the pixels to a respective image token. Each of the one or more image tokens represents a patch or region of an image, which patches or regions, when assembled, form the output image 112. That is, the image tokens may be or represent patches or regions of the output image 112.

The system is then configured to append (i.e., immediately after the "boi" token) the sequence of image tokens 114 to the current output sequence of tokens as the next tokens in the output sequence of multimodal tokens. The current output sequence then includes multimodal tokens of a first modality (i.e., text) and multimodal tokens of a second modality (i.e., image).

Processing the image to convert pixels of the image into a sequence of image tokens may be performed by a block encoder (not shown in FIG. 1). Each image token may comprise a block encoding of values of the pixels in a different region of the image that maps a set of values of the pixels to a respective image token.

In some implementations, the system or block encoder encodes each region or block of the image independently of other regions (e.g., blocks) of the image. Each block or region of the image that is mapped or encoded into an image token may have a fixed size or dimension. Accordingly, in some implementations, the number of image tokens generated by the system or block encoder is variable and depends upon the image size. That is, larger resolution images are encoded into more tokens.

In some implementations, any given image token generated by the system or block encoder is not dependent on any previously generated image token(s) (e.g., either the same image or a different image generated by the image generation subsystem).

In some implementations, the encoding may be consistent or deterministic, e.g., constant, in the sense that the system or encoder will encode the same set of value of pixels in an image region into the same respective image token.

In some implementations, the block encoder is a differentiable block encoder, i.e., it has learnable parameters that can be updated using a gradient descent optimization algorithm. It can be implemented, e.g., using a neural network.

In some implementations, the token generation neural network 102 is configured to continue processing a combined sequence, comprising the input sequence of multimodal tokens and the current output sequence of multimodal tokens to generate or cause to generate further tokens for appending to the output sequence of multimodal tokens. The further tokens may include text tokens, "boi" tokens, image tokens generated from further output images generated by the image generation subsystem 104 in response to the token generation neural network generating a "boi" token, or an "eos" token. The "eos" token is the final token of the output multimodal token sequence.

In some implementations, processing the image to convert pixels of the image into a sequence of image tokens comprises processing the image to divide the image into a set of regions or patches that tile the image, and determining each image token as a linear projection of the values of the pixels in each respective region. That is, implementations of the block encoding for processing the output image into respective image tokens does not use a discrete lookup table. In implementations the linear projection projects from a dimension determined by a number of pixel values in the region or patch to a dimension that matches a dimension of each one of the multimodal tokens.

In some implementations, the multimodal data of the input and output sequence comprises audio data. Audio data, which may represent spoken words, can comprise values of an audio waveform, e.g., instantaneous amplitude values of the waveform. Audio data can be represented as a spectrogram (i.e., an image of a time-frequency representation of the instantaneous amplitudes of the audio waveform). That is, in some implementations, the image comprises an audio spectrogram.

In such implementations, the system is configured to convert the audio spectrogram to time series audio data for an audio waveform. The spectrogram can be, e.g., a mel-spectrogram. The time series audio data for the audio waveform can represent instantaneous amplitude values of the audio waveform. The audio waveform may comprise a waveform of speech in a natural language.

As a spectrogram is a form of image, the image generation subsystem should not be interpreted to be limited to only outputting images associated with a particular frequency range of the electromagnetic spectrum (e.g., of optical light, of infrared light, of ultraviolet light, etc.). That is, the image generation subsystem may generate an image representing an audio data (in the form of a spectrogram), which is then block encoded into image tokens (e.g., one or more audio tokens) as described above.

In some implementations also or instead of an image generation subsystem, the data generation system 104 may comprise an audio generation system, e.g., an audio diffusion model or an autoregressive audio generation model.

The token generation neural network can be a Transformer neural network, e.g., a so-called decoder-only Transformer neural network, i.e., a neural network characterized by having a succession (e.g., one or more) of self-attention neural network layers. An example transformer model is described in Vaswani, et al. (arXiv:1706.0372). More specifically, the neural network can include one or more transformer layer blocks. A transformer layer block, as used in this specification, is a collection of one or more attention neural network layers.

For example, the one or more neural network layers in the transformer layer block can include one or more attention or self-attention neural network layers that each use an attention mechanism to apply an attention or self-attention operation; these may be followed by a feedforward neural network layer.

In some implementations, the token generation neural network 102 may comprise one or more self-attention neural network layers. A self-attention neural network layer has an attention layer input for each element of the input and is configured to apply an attention mechanism over the attention layer input to generate an attention layer output for each element of the input. There are many different attention mechanisms that may be used. For example, a self-attention operation can be one that applies an attention mechanism to elements of an embedding (a representation of an entity as an ordered collection of numerical values), to update each element of the embedding. For example, an input embedding can be used to determine a query vector and a set of key-value vector pairs, and the updated embedding can comprise a weighted sum of the values, weighted by a similarity function of the query to each respective key.

Generally, to apply the self-attention operation in an attention layer, each attention mechanism uses one or more attention heads. Each attention head generates a set of queries, a set of keys, and a set of values, and then applies any of a variety of variants of query-key-value (QKV) attention, e.g., a dot product attention function or a scaled dot product attention function, using the queries, keys, and values to generate an output.

As a particular example, in an attention head of a self-attention neural network layer, the attention mechanism may be configured to apply each of a query transformation, a key transformation, and a value transformation, to the attention layer input for each embedding of an input sequence X to derive a respective query vector, key vector, and value vector which are used to determine the updated embedding. The query, key, and value transformations can be any respective linear transformations or any other appropriate learned transformation. For example, the attention head can generate an updated embedding for each input position computing a weighted sum of the values, weighted by a similarity function of the query for the input position to the corresponding key. The similarity function may comprise, e.g., a dot product, cosine similarity, or other similarity measure.

When the attention head uses position encoding, the application of the dot product attention function, the computation of the queries, keys, and values, or both depend on the relative or absolute positions of the embeddings corresponding to the queries, keys, and values within the input sequence.

For example, an implementation of RoPE can involve determining, for a given query at a respective input position, a query rotation matrix that represents the absolute or relative position of the respective input position of the query, e.g., an index of the input position in the sequence; determining, for a given key at a respective input position, a key rotation matrix that similarly represents the absolute or relative position of the respective input position of the key, e.g., an index of the input position in the sequence, and multiplicatively combining the query rotation matrix, the key rotation matrix, the query (vector), and the key (vector), to determine a weight value between the query and the key that is dependent on a relative distance between the position corresponding to the key and the position corresponding to the query.

As another example, an implementation of ALiBi can involve adding a linear bias matrix to a weight determined from a combination of the key and the query.

When the attention head does not use position encoding, both the application of the dot product attention function and the computation of the queries, keys, and values, are independent of the relative or absolute positions of the embeddings corresponding to the queries, keys, and values within the input sequence.

Each query, key, value can be a vector that includes one or more vector elements. When there are multiple attention heads, the attention block then combines the outputs of the multiple attention heads, e.g., by concatenating the outputs and, optionally, processing the concatenated outputs through a linear layer.

For local attention mechanisms, for each position, the positions that are used to generate the queries, keys, and values for the position are defined by the local window size for the local attention mechanism, i.e., non-zero attention weights for a given position are computed only for positions that are within the local window of the given position.

In some cases, because the attention applied by the attention layers is causal, the system can store, for any given attention mechanism and when generating the output for any given input position, the embeddings or the keys and values already computed for earlier input positions steps rather than re-computing the embeddings (or the keys and values) for earlier time steps.

Thus, in these cases, updating the respective embeddings for each of the input positions by applying an attention mechanism to the respective embeddings refers to updating the respective embedding for the last input position in the current input sequence using keys and values or embeddings for the other input positions that have been retrieved from memory (e.g., from a "cache"). Storing keys and values in a memory for later re-use can be referred to as storing the keys and values in a "KV cache."

In some implementations, some, or all of the layer blocks in the neural network can include other types of layers in addition to attention layers, e.g., normalization layers, residual connection layers, feedforward layers, and so on.

At inference time, the transformer can operate in an autoregressive mode.

In the autoregressive mode, the transformer generates an output sequence of tokens by, at each of multiple time steps, processing the most recently generated token in the output sequence to generate a new output token to be added to the output sequence.

In some implementations the image generation subsystem comprises a diffusion model image generation subsystem. That is, the input image is generated by sampling values for the pixels of the image, or for the latent vector representation thereof, from a noise distribution. Generating the image then comprises initializing the image or a latent vector representation thereof, by sampling values for the pixels of the image or for the latent vector representation from a noise distribution. Generating the image can also comprise, at each of a series of time steps, determining an updated version of the image or the latent vector representation thereof (for example, by processing the time step, and the image or the latent vector representation thereof, at the time step), and using the image generation neural network, conditioned on the features representing the current output sequence of multimodal tokens, to determine a reduced noise version of the image or of the latent vector representation thereof. An example of implementing the diffusion model in latent variable space is described in arXiv:2112.10752.

Where a moving image is to be generated using a diffusion model, this can be done in various ways. As one example the temporal axis can be treated as an extra spatial dimension. As another example a technique such as that described in arXiv:2402.09470 can be used.

Figure 3A:
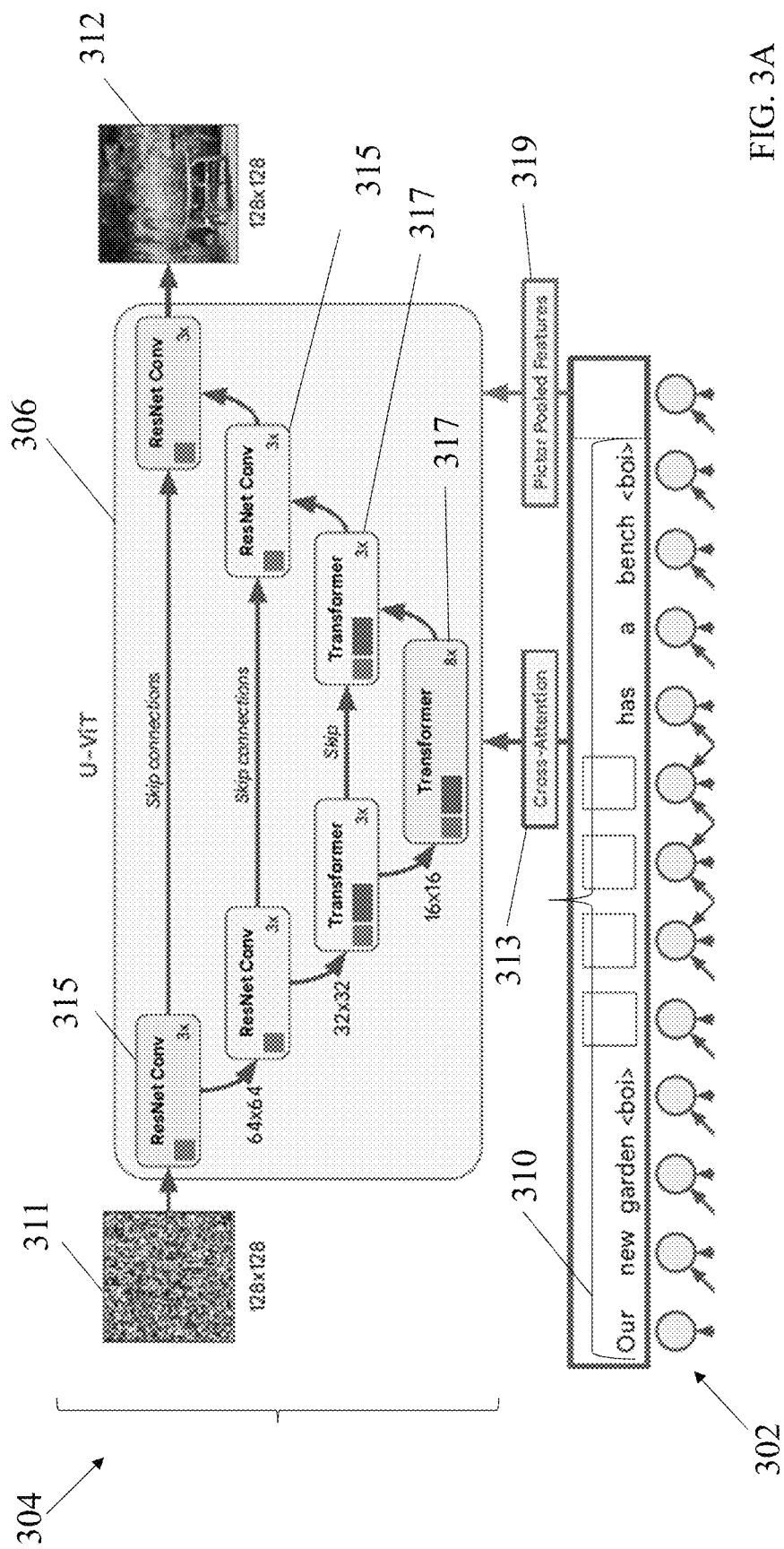
FIG. 3A and FIG. 3B show a specific implementation of an image generation subsystem.

In some implementations, as shown in FIG. 3A below in more detail, the image generation neural network has a U-net architecture. In general, a U-Net architecture maps an input of a given dimensionality to an output of the same dimensionality. The U-net architecture has one or more cross-attention neural network layers. In implementations, using the image generation subsystem to generate the predicted image conditioned on features representing the current output sequence, includes using the one or more cross-attention neural network layers to attend to features of the current output sequence obtained by processing the current output sequence (e.g., the "boi" token) using the token generation neural network.

A cross-attention neural network layer can be similar to the above described self-attention neural network layer, but with the query derived from one embedding and the keys and values from a different embedding. For example, the queries can be obtained from features generated by the U-Net and the keys and values can be obtained from the features of the current output sequence.

In some implementations, e.g., where the token generation neural network has a Transformer neural network architecture, the features of the current output sequence may comprise, e.g., features of a final self-attention neural network layer of the token generation neural network, or features of a subsequent linear layer, or features of a subsequent softmax layer ("soft tokens").

In some implementations, as each successive multimodal token is generated, features, and in particular output features, of the token may be cached for later use in by the cross-attention neural network layer.

Example tasks that can be implemented by the system 100 are now described:

The task may include generating an image specified by the prompt.

The prompt may include an image. The task may include generating a modified version of the image. A modification to be performed may be described by the prompt.

The prompt may include an image. The task may include an optical character recognition task that involves generating an output sequence of multimodal tokens that represents words or characters in the image.

The prompt may include an image. The task may include generating an output sequence of multimodal tokens that represents an answer to a question about the image.

The prompt may include an image and identifies one or more objects in the image. The task may include generating an output sequence of multimodal tokens that defines a presence, location, orientation, or count of one or more of the objects in the image.

The prompt may include an image. The task may include generating an output sequence of multimodal tokens that describes a content of the image or that classifies a content of the image into one or more of a plurality of categories.

In some implementations, the prompt sequence may comprise text and/or audio that defines an audio generation task. The time series audio data for the audio waveform may define audio that is specified by the prompt sequence. The audio may include spoken words in a natural language.

In some implementations, the prompt sequence may include text or audio that defines an image generation task or image processing task. The image may define a result of the task. The task may include generating an image specified by the prompt.

The prompt may include an image and the task may include generating an edited version of the image, where an edit to be performed is described by the prompt.

The prompt may include an image and the task may include an optical character recognition task that involves generating an output sequence of multimodal tokens that represents words or characters in the image.

The prompt may include an image and the task may include generating an output sequence of multimodal tokens that represents an answer to a question about the image.

The prompt may include an image and identify one or more objects in the image and the task may include generating an output sequence of multimodal tokens that defines a presence, location, orientation, or count of one or more of the objects in the image.

The prompt may include an image and the task may include generating an output sequence of multimodal tokens that describes a content of the image or that classifies a content of the image into one or more of a plurality of categories.

The prompt may include an image and define a goal for a mechanical agent acting in a real-world environment and the task may include generating an output sequence of multimodal tokens that defines one or more actions to be performed by the mechanical agent to achieve the goal. In some implementations, the system is configured to cause the mechanical agent to perform the one or more actions defined by the output sequence of multimodal tokens.

Figure 2:
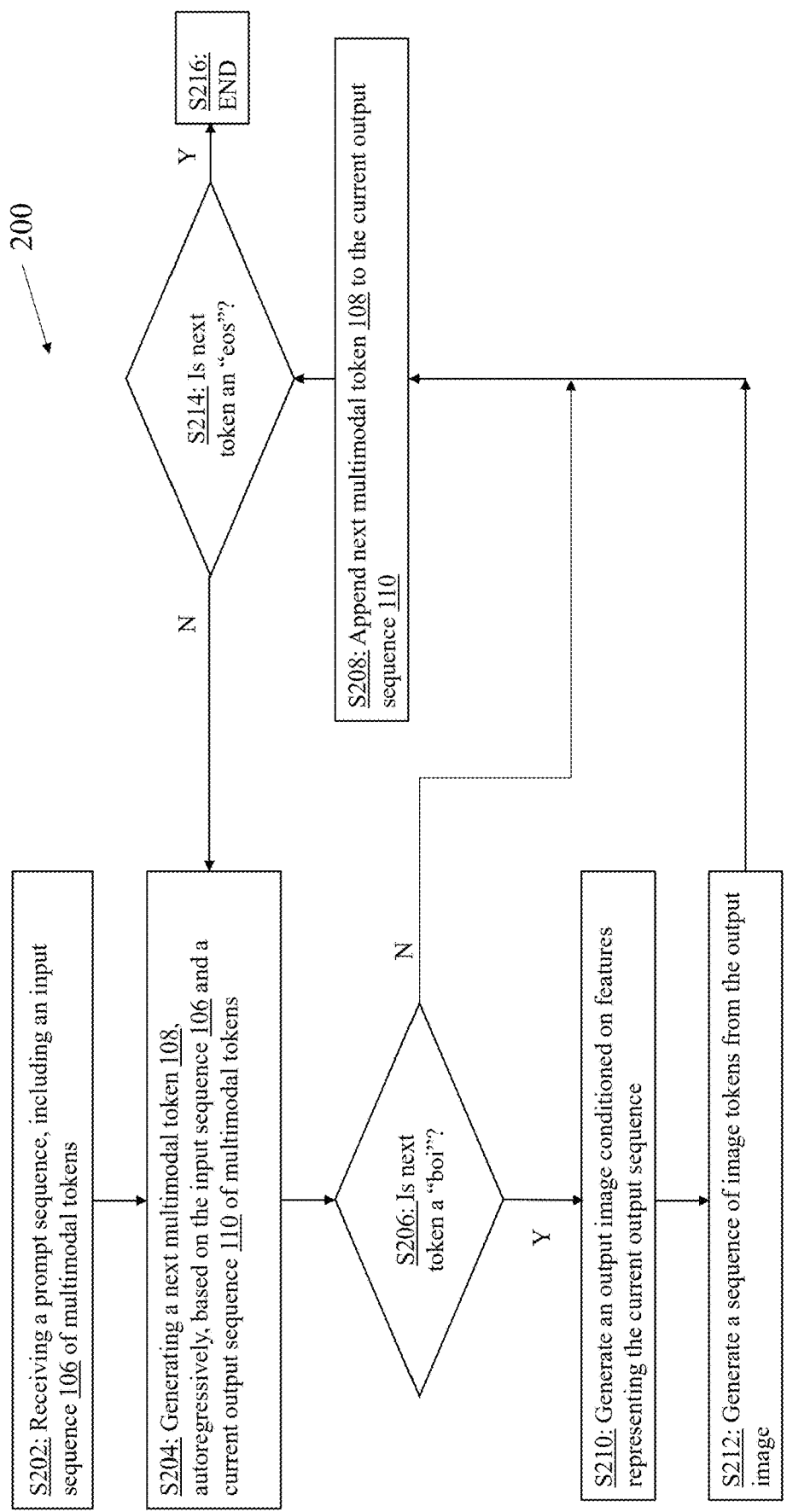
FIG. 2 is a flow diagram of an example process for generating multimodal data.

FIG. 2 is a flow diagram of an example process 200 for generating multimodal data. The process of FIG. 2 may be implemented by one or more computers in one or more locations, for example the system shown in FIG. 1.

In step 202, the method comprises receiving a prompt sequence that defines or includes an input sequence 106 of multimodal tokens.

As above, the input sequence of multimodal tokens may comprise multimodal tokens representing a combination of two or more of: text, audio, or image data elements. The text data elements can be, e.g., words or wordpieces as previously described. The audio data elements can represent time segments of audio (e.g., an audio waveform). The image data elements can comprise pixel values for an image or a region (e.g., a patch) of an image.

In some implementations, the one or more image tokens in the input sequence include "raw" (i.e., unprocessed) pixel patches of an image. This improves inference as the one or more images associated with the one or more image tokens are associated with no information loss.

In some implementations the method further includes adding a token position encoding to each of the multimodal tokens (e.g., audio, image and/or text tokens) in the input sequence. Any appropriate position encoding can be used, e.g., relative position encoding, rotary position encoding (such as RoPE), or absolute position encoding.

In step 204, the method comprises generating autoregressively, using the token generation neural network 102, a next multimodal token for an output sequence of multimodal tokens 116 by processing a combined sequence comprising the input sequence of multimodal tokens and a current output sequence of multimodal tokens. The current output sequence may initially be empty or null. The modalities of the output sequence may be any two or more of: text, audio, and/or image data elements.

In step 206, the method comprises appending the next multimodal token 108 to the current output sequence 110. This step represents an updating of the current output sequence to include the last previously multimodal token generated by the token generation neural network 102.

In step 208, it is determined whether the next multimodal token is a "begin-of-image" or "start-of-image" (i.e., a "boi" token). If the determination is negative, the method proceeds to repeat step 204 (or optionally with step 216), i.e., to generate a new multimodal token. Steps 204 to 206 may therefore repeat for each successive position in the output sequence of multimodal tokens, until a "boi" token is generated by the token generation neural network. If the determination is affirmative, the method proceeds to step 210.

In step 210, the image generation subsystem generates an image conditioned on features representing the current output sequence of multimodal tokens obtained from the token generation neural network (and which includes the "boi" token). That is, the image generation subsystem is triggered to generate an output image conditional upon the token generation neural network generating a "boi" token. The output image generated is conditioned on features representing the current output sequence of the tokens obtained from the token generation neural network.

In a specific implementation, the features used to condition the image generation subsystem are determined or otherwise obtained from the output features of the "boi" token, which are used to generate a summary multimodal token. The "boi" token is a convenient choice for generating the summary multimodal token because, as the token generation neural network generates successive tokens autoregressively, it already represents or provides a summary of all preceding tokens generated by the token generation neural network, and because it has no target text token to predict. For example, the current output sequence, including the "boi" token, is taken as input to the token generation neural network 102. The output features of the "boi" token are then used to condition the image generation subsystem.

Alternative implementations for generating the summary multimodal token are envisaged, e.g., in which all preceding tokens (or all preceding tokens before a start of sentence token) generated by the token generation neural network 102 are used to generate the summary multimodal token. This may involve pooling features from the output features from the preceding tokens in the current output sequence. In yet further implementations, a combination of pooled features and the features derived from the "boi" token can be used for generating the summary multimodal token for conditioning the image generation.

In some implementations, the method includes processing the combined sequence including the start-of-image token using the token generation neural network to generate features of a summary multimodal token. The summary multimodal token may be generated as described above, i.e., autoregressively, so that it comprises features that summarize the current output sequence. Generating an image using the image generation subsystem conditioned on features representing the current output sequence of multimodal tokens obtained from the token generation neural network can include generating the image using the image generation subsystem conditioned on the features of the summary multimodal token. Generation and use of a summary multimodal token may be performed in combination with or alternatively to any of the other methods of conditioning image generation described herein.

In step 212, a sequence of image tokens is generated from the output image. That is, the pixels of the image are processed into a sequence of image tokens. Each image token comprises a block encoding of values of the pixels in different regions (or patches) of the image that maps a set of values of the pixels to a respective image token.

In some implementations, processing the image to convert pixels of the image into a sequence of image tokens comprises processing the image to divide the image into a set of regions or patches that tile the image, and determining each image token as a linear projection of the values of the pixels in each respective region. That is, implementations of the block encoding for processing the output image into respective image tokens does not use a discrete lookup table. In implementations the linear projection projects from a dimension determined by a number of pixel values in the region or patch to a dimension that matches a dimension of each one of the multimodal tokens.

In step 214, the sequence of image tokens is appended to the current output sequence of multimodal tokens as the next multimodal tokens in the output sequence of multimodal tokens. This step represents an updating of the current output sequence to include any image tokens generated by the image generation subsystem in response to the token generation neural network generating a "boi" token.

In optional step 216, the method comprises determining whether the next multimodal token is an "end of sequence" token. If the determination is affirmative, the method proceeds to step 218. If the determination is negative, the method proceeds to step 204.

In step 218, the method ends.

In this way, performing steps 204 to 206 or steps 204 to 214 results in the input sequence of multimodal tokens 106 being processed to generate an output sequence of multimodal tokens.

In some implementations, the method further includes continuing to process the combined sequence after appending the sequence of image tokens to the current output sequence of multimodal tokens, to generate further multimodal tokens for the output sequence of multimodal tokens. That is, steps 204 to 206 and steps 204 to 214 may be repeated to continue processing a combined sequence, comprising the input sequence of multimodal tokens and the current output sequence of multimodal tokens to generate or cause to generate further tokens for appending to the output sequence of multimodal tokens. The further tokens may include text tokens, "boi" tokens, image tokens generated from further output images generated by the image generation subsystem 104 in response to the token generation neural network generating a "boi" token, or an "eos" token. The "eos" token is the final token of the output multimodal token sequence. As noted above, the "eos" token triggers the end of the method.

As noted above, in some implementations, the multimodal data of the input and output sequence comprises audio data. Audio data, which may represent spoken words, can comprise values of an audio waveform, e.g., instantaneous amplitude values of the waveform. Audio data can be represented as a spectrogram (i.e., an image of a time-frequency representation of the instantaneous amplitudes of the audio waveform). That is, in some implementations, the image comprises an audio spectrogram.

In such implementations, the method further comprises converting the audio spectrogram to time series audio data for an audio waveform. The spectrogram can be, e.g., a mel-spectrogram. The time series audio data for the audio waveform can represent instantaneous amplitude values of the audio waveform. The audio waveform may comprise a waveform of speech in a natural language.

As described above, it will be understood that a spectrogram is a form of image and the method 200 may involve outputting an audio image, which is then block encoded into image tokens (e.g., one or more audio tokens).

Example prompt sequences are as described above.

FIG. 3A shows a specific implementation of an image generation subsystem 304. The image generation subsystem comprises a diffusion model neural network 306 (also referred to herein simply as "diffusion model") with a U-ViT (Ronneberger, et al., "U-Net: Convolutional Networks for Biomedical Image Segmentation", arXiv:1505.04597) architecture that maps an input image 311 of a given dimensionality (e.g., a 128×128 matrix) to an output image 312 of the same dimensionality (e.g., a 128×128 matrix).

Figure 3B:
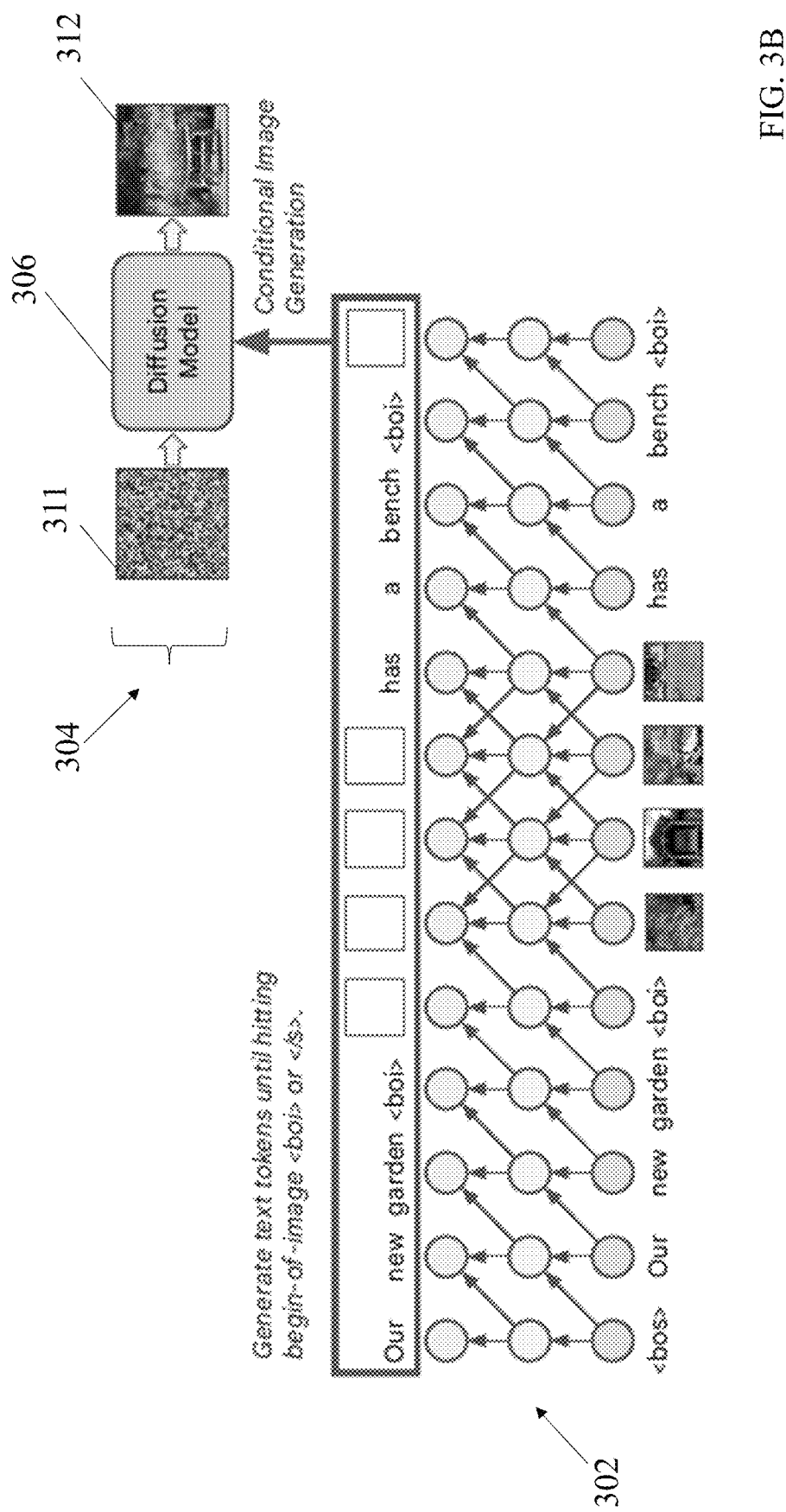

FIG. 3A also shows the current output sequence 310 generated by the token generation neural network 302, which is truncated to show only its output layer. FIG. 3B shows an illustration of the image generation subsystem 304 together with the token generation neural network 302, in which the input to the token generation neural network 302 is shown, where a begin-of-image token is the final token in the input sequence of tokens. For simplicity, only the autoregressive arrows to direct neighbors are visualized. In the example illustration shown, the token generation neural network 302 is combined with a diffusion model neural network 306 for image generation. The diffusion model neural network 306 is conditioned on all output features of the token generation neural network 302, supporting an end-to end training on interleaved sequences. When generating a begin-of-image token during inference, the diffusion model neural network 306 is triggered to generate the next image. In the example illustration shown, the new image tokens are passed in parallel to the token generation neural network 302, which allows for a bidirectional attention mask between image tokens. In an example implementation, the image tokens are encoded with a single linear layer, and do not use a separate image encoder. In an example implementation, for input of the language modality, the text is tokenized and each token encoded using an embedding lookup-table. In an example implementation, for images, the images are patchifield into a sequence of tokens, and forwarded through a single linear layer to obtain the same hidden size as text tokens. The token generation neural network 302 in the example illustration shown has a single-tower architecture. A single-tower architecture may have the benefit of being efficient to train (single training loop and task), reducing hyperparameters, and allowing the model to flexibly allocate model complexity to the different modalities. The latter can be of importance at scale. For example, for a unified architecture, only a single model is scaled, and can thus follow scaling strategies as, for example, for language modeling.

The diffusion model is conditioned on features representing the current output sequence of tokens (which may include any combination of text, audio, or image tokens).

In the implementation shown, the conditioning is achieved by including a cross-attention layer (denoted schematically 313 in FIG. 3A) to the normalized output features in each vision transformer (ViT) block. The features used for cross-attention may be generated based on the above-described summary multimodal token (e.g., using the "boi" token and/or all preceding tokens) generated by the token generation neural network 102, 302 are used to generate the summary multimodal token. Optionally, this involves pooling features to generated pooled features 319 from the output features from the preceding tokens in the current output sequence. In yet further implementations, a combination of pooled features 319 and the features derived from the "boi" token can be used for generating the summary multimodal token for conditioning the image generation.

In general terms, the U-ViT may include, e.g., a set of ResNet blocks and a set of Transformer blocks in the down path, an up path that matches the down path, and a middle path that including another set of Transformer blocks. That is, the U-ViT may include one or more ResNet blocks (He, et al., "Deep residual learning for image recognition", Proc. IEEE conference on computer vision and pattern recognition. pp. 770-778, 2016) and one or more self-attention layers.

In the specific example shown, the diffusion model includes four ResNet blocks 315 split across two levels and three self-attention ViT blocks 317 split across two further levels. The ResNet blocks are arranged at higher resolution levels (e.g., 128×128 and 64×64), whereas the self-attention ViT blocks are split across two of the lower resolution levels (e.g., 32×32 and 16×16).

In some implementations, the ResNet blocks of the down and up path may be connected to preserve high resolution information that may otherwise be lost at the lower resolution levels. This is denoted in FIG. 3A by the arrow labelled "Skip (connections)".

In general terms, a diffusion model can be used to generate an output image 312 from a diffusion input (e.g., an initial noisy image 311). In some implementations, the diffusion neural network can include a convolutional neural network, e.g., a U-Net or other architecture that maps one input of a given dimensionality to an output of the same dimensionality. In some implementations, the diffusion neural network can additionally or alternatively include a Transformer neural network that processes an input through a set of self-attention layers to generate an output.

At each of one or more updating iterations, the diffusion model processes a diffusion input for the updating iteration, that includes a current noisy data item for the updating iteration, to generate a denoising output. At the first time step, the current noisy data item is an initial noisy data item. At each updating iteration, the denoising output generated by the diffusion neural network is used to update the current data item as of the updating iteration, generating an updated current data item. The current noisy data item corresponds to the updated noisy data item generated in the preceding iteration. In this manner, the diffusion neural network is used to perform a reverse diffusion process across one or more updating iterations to generate the output data item.

A trained diffusion neural network can, at any given updating iteration, process a diffusion input for the updating iteration that includes a current data item (as of the updating iteration) to generate a denoising output for the updating iteration. In some implementations, the denoising output is an estimate of the noise component of the current data item, i.e., the noise that needs to be combined with the output data item to generate the current data item. In some other implementations, the denoising output is an estimate of the output data item given the current data item, i.e., an estimate of the data item that would result from removing the noise component of the current data item.

It will be understood that the diffusion model can have any appropriate architecture that allows the neural network to map a diffusion input that includes a noisy data item to a denoising output. For example, the diffusion model can have one or more further levels, including one or more transformer neural networks and/or convolution neural networks.

In the implementation shown in FIG. 3A, the diffusion model is configured as a conditional model that generates a denoising output conditioned on a conditioning input. As mentioned above, the conditioning input includes features representing the current output sequence of multimodal tokens obtained from the token generation neural network (and which includes the "boi" token). That is, the diffusion model is configured to generate an output image 112 that has features characterised by the conditioning input.

More generally, the conditioning input can include or represent one or more different types of inputs of one or more different modalities, e.g., any combination of text, audio, and image data elements. In some implementations, the conditioning input can include one or more images, or other sensor data, captured from a real-world environment.

The diffusion model neural network can be conditioned on the conditioning input (e.g., the features representing the current output sequence 310 of multimodal tokens obtained from the token generation neural network 302) in any of a variety of ways.

For example, the noisy data item may be concatenated or otherwise combined with the conditioning input and processed by the input layer of the diffusion model neural network. For example, the diffusion input may comprise multiple channels, with the initial values for one or more channels being taken from the conditioning input and the initial values for the remaining one or more channels being the noisy data item. The diffusion input may be generated by concatenating a noisy data item with the conditioning input along the channel dimension. Alternatively, the diffusion input may be generated by including one or more conditioning embeddings generated from the conditioning input at some positions in the diffusion input, and including one or more embeddings from the noisy data item at the remaining positions.

The conditioning input may be taken as input to one or more intermediate layers of the diffusion model neural network or the final layer of the diffusion model neural network for example. The conditioning input may be combined with the output of one or more layers of the diffusion model neural network, and the result processed by the subsequent layer of the diffusion model neural network.

For example, the conditioning input may be incorporated by one or more cross-attention layers of the model, e.g., as shown in FIG. 3A. That is, the diffusion model can include one or more cross-attention layers that each cross-attend into the one or more embeddings. Each of the one or more cross-attention neural network layers can be similar to a self-attention neural network layer, but with the query derived from one embedding and the keys and values from a different embedding. For example, the queries can be obtained from features generated by the U-Net and the keys and values can be obtained from the features of the current output sequence. An embedding, as used in this specification, is an ordered collection of numerical values, e.g., a vector of floating point values or other types of values.

The diffusion model input at any given updating iteration can also include data defining a noise level for the iteration. Generally, each updating iteration has a corresponding time step t and the noise level for the iteration depends on the time step. For example, the noise level can be a decreasing function of the time step t. Examples of such functions include a linear function, a cosine function, and a sigmoid function. In these cases, data identifying the noise level, the time step, or both can be embedded using an appropriate neural network, e.g., a multi-layer perceptron (MLP) and used to condition the diffusion neural network, as described above for the conditioning input for example.

In some implementations, the noisy data item may be initialised, i.e., the first instance of the noisy data item can be generated, by sampling a value for each element in the data item from a corresponding noise distribution, e.g., a Gaussian distribution or a different noise distribution. For example, the initial noisy data item may be generated by sampling initial numerical values for each of multiple embeddings included in the initial noisy data item from a corresponding noise distribution, e.g., a Gaussian distribution or another predetermined distribution. The initial noisy data item therefore includes the multiple embeddings, with the initial values for each embedding being sampled from a corresponding noise distribution.

When configured as a conditional model, the diffusion model input for the first updating iteration comprises the initial noisy data item and the conditioning input, and may further comprise data defining a noise level for the iteration. The output data item is then generated by updating the noisy data item at each of a plurality of updating iterations. In other words, the output data item is the data item after the last iteration of the plurality of updating iterations. The noisy data item at the first updating iteration is the initial noisy data item.

When configured as a conditional model, the diffusion model input for each subsequent updating iteration comprises the current noisy data item and the conditioning input, and may further comprise data defining a noise level for the iteration. An updated current noisy data item is generated in each updating iteration. The current noisy data item corresponds to the updated noisy data item generated in the preceding iteration.

At each updating iteration, the denoising output generated by the diffusion neural network is used to update the current data item as of the updating iteration, generating an updated current data item. For example, the system can determine an initial estimate of the output data item using the denoising output and then apply an appropriate diffusion sampler to the initial estimate to update the current data item. For example, when the denoising output is a prediction of the output data item, the denoising output can be directly used as the initial estimate. When the denoising output is a prediction of the noise component, the initial estimate can be determined from the current data item, the denoising output, and the noise level for the current updating iteration. Any appropriate diffusion sampler may be used to update the current noisy data item, e.g., the DDPM (Denoising Diffusion Probabilistic Model) sampler, the DDIM (Denoising Diffusion Implicit Model) sampler or another appropriate sampler, to the estimate to generate the updated current data item. DDPMs are, for example, discussed in Ho, et al., arXiv:2006:11239.

After the last updating iteration, the updated current data item may be taken as the output data item. Optionally, after the last iteration, the initial estimate may be directly taken as the updated current data item (without use of a sampler).

In some implementations, the number of updating iterations is fixed. In other cases, the number of iterations may be adjusted based on a latency requirement for the generation of the output data item, i.e., the number of iterations is selected so that the output data item will be generated to satisfy the latency requirement. In yet other cases, the number of iterations may be determined based on a computational resource consumption requirement for the generation of the output data item. For example, the requirement can be a maximum number of floating operations (FLOPS) to be performed as part of generating the final output data item.

As described above, a reverse diffusion process is performed across the updating iterations by updating the current data item at each iteration. Each updating iteration corresponds to a different time point in a time interval, e.g., the interval between zero and one, or another appropriate time interval. The time point is also referred to as a time step t or a time index t. For example, the updating iterations can be evenly spaced across the time interval, i.e., at regular intervals within the interval, or can be arranged within the time interval according to a different scheme.

For the first updating iteration, the current data item is the noisy initial data item. For each subsequent updating iteration, the current data item is the data item after being updated at the preceding updating iteration, i.e., the updated current data item from the preceding updating iteration.

As described above, the noise component of the current data item is the noise that would be added to an output data item in order to generate the current data item. For example, at an iteration with time index t, i.e., the time point ("time step") corresponding to the updating iteration is t, the current data item $x_t$ can be expressed as $x_t = \alpha_t x_0 + \sigma_t \varepsilon$, where $\varepsilon$ is a noise component and $x_0$ is the output data item. $\alpha_t$ and $\sigma_t$ can be determined according to a pre-determined schedule across time indices t, e.g., a linear schedule, a quadratic schedule, a cosine schedule, and so on. In one example, $$\alpha_t = \sqrt{1 - \sigma_t^2}$$

and $\sigma_t$ can be a value between zero and one, where the value is taken from a pre-determined schedule across time indices.

For example, at an updating iteration corresponding to reverse diffusion time index t, the current noisy data item $x_t$ is updated based on the denoising output for the updating iteration. The current noisy data item after being updated will be referred to as the updated noisy data item $x_{t-1}$; where the updated current data item for the final updating iteration may be taken as the output data item $x_0$. At any given updating iteration, the current noisy data item, which is provided as (a part of) the diffusion input, will be the updated current noisy data item that has been generated in the immediately preceding updating iteration. For the very first iteration, the current noisy data item is the initial noisy data item. At each updating iteration, the denoising output generated by the diffusion neural network is used to update the current data item as of the updating iteration. For example, when the denoising output is a prediction of the output data item, to generate the updated noisy data item $x_{t-1}$, the denoising output may be projected to the noise level corresponding to the time index t−1.

For example, at each iteration other than the last, an estimate of the updated current noisy data item is generated using the denoising output (used to generate an initial estimate of the output data item) and a diffusion sampler. The system can use any appropriate diffusion sampler to update the current noisy data item, e.g., the DDPM (Denoising Diffusion Probabilistic Model) sampler, the DDIM (Denoising Diffusion Implicit Model) sampler or another appropriate sampler, to the estimate to generate the updated current data item. DDPMs are, for example, discussed in Ho, et al., arXiv:2006.11239. For the last iteration, the estimate can be the initial estimate generated using the denoising output or can be generated using the sampler. When the denoising output is an estimate of the noise component, the initial estimate of the output data item can be determined as $(x_t - \sigma_t \hat{\varepsilon})/\alpha_t$, where $\hat{\varepsilon}$ is the denoising output. When the denoising output is an estimate of the output data item, the denoising output can be used as the initial estimate.

Some implementations make use of guidance when performing the reverse diffusion process. That is, the reverse diffusion process is sometimes a guided reverse diffusion process. For example, classifier guidance or classifier-free guidance may be used. Classifier-free guidance is described in, for example, Ho and Salimans, arXiv:2207.12598.

The diffusion neural network may be trained on a set of training data items using a denoising score-matching objective (an example of an image reconstruction objective) to generate the denoising output. The denoising score-matching objective can measure an error, e.g., a mean-squared error, an L1 error, an L2 error or a different type of error, between (i) a denoising output generated by processing a diffusion input that includes a noisy data item generated by adding sampled noise to a training data item and (ii) a target denoising output generated from the training data item, from the sampled noise, or both. For example, when the denoising output is an estimate of the noise component of the current data item, the target denoising output can be the sampled noise. As another example, when the denoising output is an estimate of the target data item, the target denoising output can be the target data item.

In particular, to train the diffusion neural network using the score matching objective, a training method can comprise sampling (i) a data item from a set of training data items, (ii) one or more corresponding conditioning input(s) for the data item, (iii) a time step t for the training, e.g., uniformly at random from the time interval or according to a different distribution over the time interval, and (iv), and noise ε from the noise distribution (which may be, e.g., a Gaussian noise distribution). The system can then generate a noisy data item $x_t$ by combining the target data item $x_0$ with the sampled noise ε in accordance with the sampled time step t, e.g., by setting the noisy data item $x_t = \alpha_t x_0 + 94_t \varepsilon$. The system can then process an input that includes the noisy data item $x_t$, data specifying the time step, and the conditioning input(s) using the diffusion neural network to generate a denoising output. The system can then compute an error between the denoising output and a target denoising output and use the error to train the diffusion neural network, e.g., by determining gradients of the error and then using the gradients to update the parameters of the diffusion neural network by applying an optimizer to (at least) the gradients. As a particular example, the denoising score-matching objective can measure an error, e.g., a mean-squared error, an L1 error, an L2 error or a different type of error, between (i) the denoising output and (ii) the target denoising output.

Figure 4A:
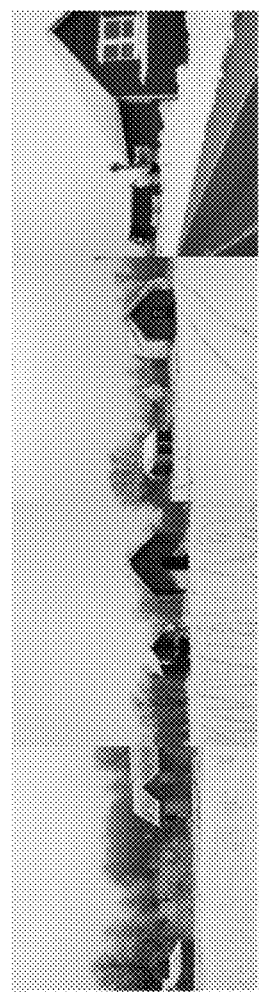
FIG. 4A and FIG. 4B show experimental inference results associated with the system for generating multimodal data.
Figure 4B:
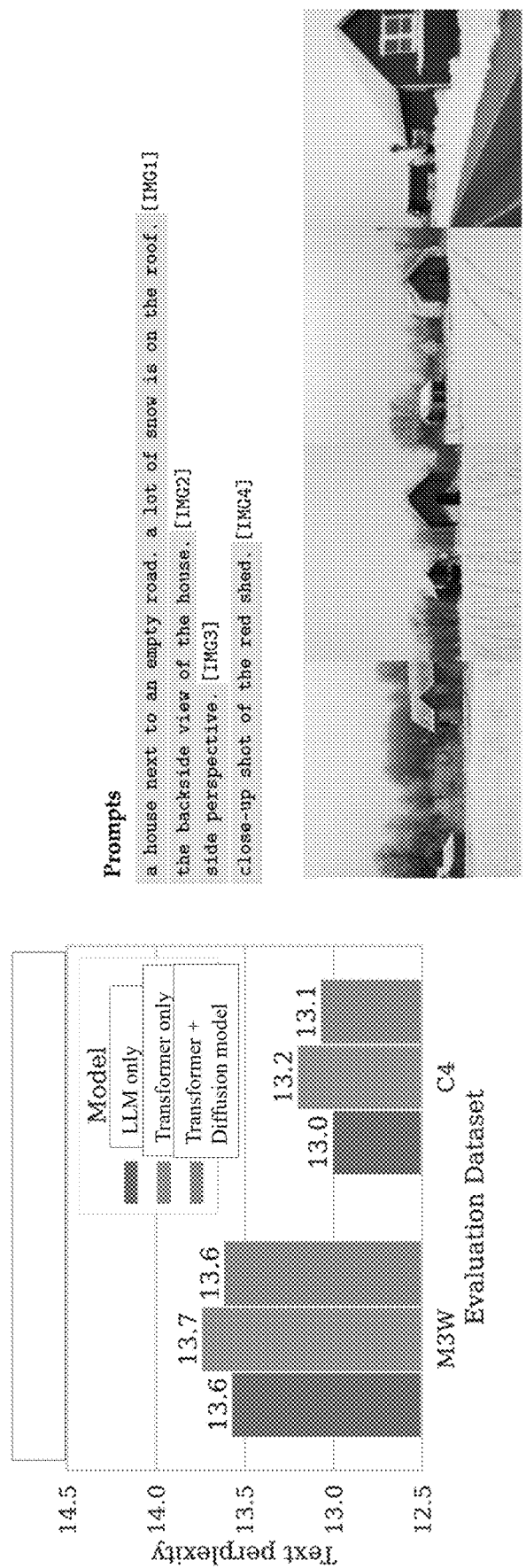

Example inference results associated with the system 100 are shown in FIG. 4A and FIG. 4B.

In FIG. 4A, text perplexity evaluation results for three models—a large language model (LLM), a transformer model, and a transformer and diffusion model (e.g., system 100)—are shown. The transformer and diffusion model may be substantially as described above, for example in FIG. 3A. Each model is trained by uniformly sampling training batches from the M3 W and C4 datasets. For the LLM, all image tokens are removed during training, such that the LLM is trained to input and output text tokens only. The transformer model is trained to input a sequence of image and text tokens and to output a sequence of image and text tokens. For both the transformer model and the transformer and diffusion model models, no loss is applied to the image tokens (i.e., they are or represent raw or unprocessed image pixel patches). All models are trained with the same batch size, number of training iterations, and number of tokens. It is noted that the LLM has effectively seen more, in this example 12% more, text tokens than the multimodal tokens due to its image tokens being removed.

As seen from FIG. 4A, while the evaluation results for the transformer and diffusion model are worse than the for the LLM only model (which might be explained by the LLM being trained on more text tokens), the transformer and diffusion model does demonstrate an improvement with respect to the transformer only model. This indicates that the transformer and diffusion model described herein is capable of facilitating a positive transfer in performance.

FIG. 4B shows a series of images (IMG1, IMG2, IMG3, IMG4) generated by the system 100 based on an initial prompt sequence, "a house next to an empty road. a lot of snow is on the roof". Further prompt sequences, e.g., "the backside view of the house", "side perspective", and "close-up shot of the red shed", are then input as further prompt sequences to cause the system to generate further respective images (i.e., IMG2, IMG3, IMG4). As shown in the figure, each successively generated image is broadly consistent both with the previously generated images and the previous input text prompts.

Figure 5:
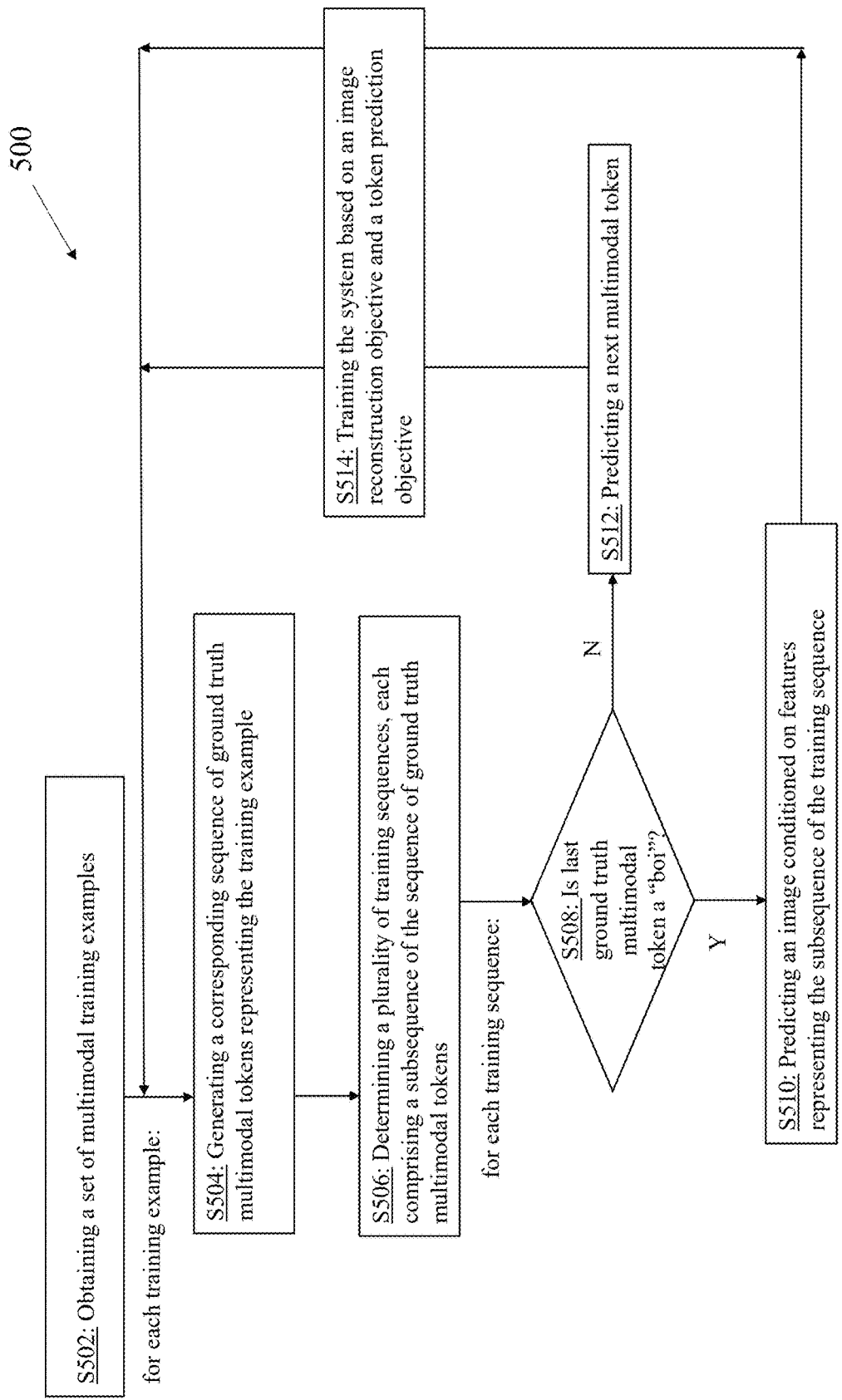
FIG. 5 is a flow diagram of an example process for training a system to generate multimodal data.

FIG. 5 shows a method 500 implemented by computer programs on one or more computers in one or more locations for training a system 100, comprising a token generation neural network 102 and an image generation subsystem 104 to generate multimodal data. In specific implementations, the token generation neural network is a transformer neural network, as described above and/or the image generation subsystem is a diffusion model generation subsystem, as described above.

In step 502, the method includes obtaining a set of multimodal training examples. Each training example may comprise two or more different data types from the following: text data, audio data, such as speech, or image data. In general, the training example includes text or audio data and at least one training image (which may, in turn, include audio data). The multimodal training examples represent training input sequences for the system.

In some implementations, obtaining the set of multimodal training examples may comprise obtaining training examples comprising i) text or first audio data and ii) second audio data. The text or audio first data, and the second audio data may be semantically related. The method may further include converting the second audio data of each training example into an audio spectrogram to obtain the training image for the training example.

In general terms, the system can be trained based on an image reconstruction objective and a token prediction objective. The image reconstruction objective may depend on an image predicted by the system and the training image (which the image is intended to predict). The token prediction objective may depend on the predicted next multimodal token (e.g., the next text token in the output sequence) and a next ground truth multimodal token (which the predicted multimodal token is intended to predict). As described in more detail below, training may involve a teacher-forcing approach.

In some implementations, the system is trained in an end-to-end fashion based on a combined objective based on the image reconstruction objective and token prediction objective. In a specific implementation, the combined objective includes summing the image reconstruction objective and the token prediction objectives.

In step 504, the method includes generating a sequence of ground truth multimodal tokens corresponding to each training example in the set of multimodal training examples. Each ground truth multimodal token may represent training data (e.g., text or audio data and at least one training image) of the corresponding training example. The sequence of ground truth multimodal tokens includes a start-of-image ("boi") token in the sequence, which is located in the sequence before the first ground truth multimodal token in the sequence of multimodal tokens that represents the training image. In general the training data can comprise examples of interleaved image-text sequences, or audio-text sequences, or a combination of these. An example is the WebLI dataset, Web Language Image, Chen, et al., arXiv: 2305.18565v1 (which has various versions of differing sizes).

In some implementations, generating the corresponding sequence of ground truth multimodal tokens includes inserting the start-of-image "boi" token in the sequence before the ground truth multimodal token representing the training image. In other implementations, the start-of-image token may already be present.

In some implementations, generating the ground truth multimodal tokens representing the training image comprises processing the training image using a block encoder to convert pixels of the training image into a sequence of image tokens, each image token comprising a block encoding of values of the pixels in a different region of the training image that maps a set of values of the pixels to a respective image token. That is, each image token in the sequence may comprise a block encoding of values of the pixels in a different region of the training image that maps a set of values of the pixels to a respective image token.

In some implementations, the one or more ground truth multimodal tokens representing the training image are "raw" (i.e., unprocessed) pixel patches of the image. The "raw" pixel patches can be assembled together to form the training image.

In some implementations, the block encoder encodes each region or block of the image independently of other regions (e.g., blocks) of the image. Each block or region of the image that is mapped or encoded into an image token may have a fixed size or dimension. Accordingly, in some implementations, the number of image tokens generated is variable and depends upon the training image size. That is, larger resolution images are encoded into a more tokens.

In some implementations, the block encoder comprises a linear image region encoding neural network. The method may comprise linearly projecting the set of values of the pixels of each region of the training image to a respective image token using the linear image region encoding neural network. The training may comprise back propagating the gradients into the linear image region encoding neural network to update weights of the linear image region encoding neural network. The block encoder may then be associated with a plurality of learnable parameters.

In some implementations, any given ground truth image token generated is not dependent on any previously generated image token(s) (e.g., either the same image or a different image generated by the image generation subsystem).

In some implementations, the encoding may be consistent or deterministic, e.g., constant, in the sense that the same set of values of pixels in any given training image region is mapped onto the same respective image token.

In some implementations, the block encoder is a differentiable block encoder, i.e., it has learnable parameters that can be updated using a gradient descent optimization algorithm. It can be implemented, e.g., using a neural network.

In step 506, a plurality of training sequences are determined, for each sequence of ground truth multimodal tokens that are generated in step 504. That is, there are a plurality of training sequences for any given training example. Each training sequence of the plurality includes a subsequence of the sequence of ground truth multimodal tokens.

By way of example, if the sequence of ground truth multimodal tokens includes tokens "A, A, B, A"; the plurality of training sequences may include sequences "A", "A, A", and "A, A, B". The system is then teacher-force trained to predict the next multimodal token in each of these training sequences. That is, "A" for the subsequence "A", "B" for the subsequence "A, A", and "A" for the subsequence "A, A, B".

In step 508, it is determined, for each training sequence determined in step 506, whether the last (or final) ground truth multimodal token in the sequence is a "boi" token. If the determination is affirmative, the method proceeds with step 510. If the determination is negative, the method proceeds with Step 512.

In step 510, the method further comprises generating a predicted image conditioned on features representing the subsequence. Step 510 may be performed by the image generation subsystem 104. That is, the method includes using the image generation subsystem to generate a predicted image in response to (or conditional upon) the last ground truth multimodal token in the subsequence being a "boi" token.

In some implementations, using the image generation subsystem to generate a predicted image conditioned on features representing the subsequence includes processing the training sequence including the start-of-image "boi" token using the token generation neural network to generate features of a summary multimodal token and using the image generation subsystem to generate the predicted image conditioned on the features of the summary multimodal token.

In a specific implementation, the features used to condition the image generation subsystem are determined or otherwise obtained from the output features of the "boi" token, which are used to generate the summary multimodal token. The "boi" token is a convenient choice for generating the summary multimodal token because, as the token generation neural network generates successive tokens autoregressively, it already represents or provides a summary of all preceding tokens generated by the token generation neural network and because it has no target text token to predict.

Alternative implementations for generating the summary multimodal token are envisaged, e.g., in which all preceding tokens (or all preceding tokens before a start of sentence token) generated by the token generation neural network 102 are used to generate the summary multimodal token (rather than only the "boi" token). This may involve pooling features from the output features from the preceding tokens in the current output sequence. In yet further implementations, a combination of pooled features and the features derived from the "boi" token can be used for generating the summary multimodal token for conditioning the image generation.

In some implementations, the conditioning on the features representing the subsequence can use, e.g., classifier-free guidance (when the image generation neural network can be trained with and without conditioning, e.g., omitting the conditioning at random).

In step 512, the method further comprises predicting a next multimodal token (e.g., a text token). Step 512 may be performed by the token generation neural network 102.

In step 514, the system is trained based on the image reconstruction objective and the token prediction objective. The image reconstruction objective may depend on an image predicted by the system and the training image (which the image is intended to predict). The token prediction objective may depend on the predicted next multimodal token (e.g., the next text token in the output sequence) and a next ground truth multimodal token (which the predicted multimodal token is intended to predict).

In some implementations, step 514 involves updating learnable parameters of the token generation neural network and the image generation neural network. In some implementations, step 514 also involves updating learnable parameters of the block encoder (if this is implemented as a neural network).

The token prediction objective may comprise a self-supervised objective. There are many different types of self-supervised objective function that may be used. As one example the system may be trained using a softmax cross entropy loss, e.g., using teacher forcing with a softmax cross entropy loss. As another example the system may be trained with an autoregressive negative log likelihood (NLL) loss, such as $$-\sum_{l=1}^{L} \log p(y_l | y_{<l})$$

for a multimodal input comprising an input sequence encoded as L tokens with the lth multimodal token $y_l$ conditioned on preceding multimodal tokens $y_{<l}$. As another example the system may be trained with a masking loss, e.g., a loss that requires the system to predict masked-out data such as masked out tokens. As another example the system can be trained using a self-supervised objective function that comprises a contrastive loss function (one that is dependent upon a positive example and one or more negative examples).

There are many image reconstruction objectives that can be used, e.g., a mean squared error objective or, in implementations, a diffusion model objective as described later.

As described above, in some implementations the training is performed using batches of interleaved text-and-image sequences. Since the number of images per sequence may strongly vary across sequences, one image per sequence/batch element is picked at random to train the image generation neural network, e.g., the diffusion model. For the conditioning, all tokens after the begin-of-image token for that image, including the patches, are masked out. Training is performed with a teacher-forcing approach, while also having a consistent batch size for the diffusion model. On these samples, training is performed in an end-to-end fashion by summing the image diffusion and average text-token negative log likelihood. The two losses may be weighted. The training was found to be quite robust against the weighting of the two losses, and showed stable results across a weighting range of 1 to 10.

In some implementations, the image generation subsystem is trained to generate images based on learned representations output by the token generation neural network. That is, the image generation subsystem learns to generate images using the conditioning generated by the token generation neural network. As the image generation subsystem is trained to better predict the ground truth multimodal tokens (which depend on any previous image tokens), the token generation neural network and image generation subsystem can improve jointly.

In some implementations the training includes backpropagating gradients of the image reconstruction objective from the image generation subsystem into the token generation neural network. That is, the image generation subsystem and token generation neural network are trained "jointly". If the image generation subsystem includes a diffusion model, this can be from a sequence of image generation steps, or from a selection of random t-steps.

In some implementations, the training includes back propagating gradients of the image reconstruction objective and of the token prediction objective through the token generation neural network into the block encoder to update the learnable parameters of the block encoder (if the block encoder is implemented as a neural network).

As has already been described, the token generation neural network may include one or more self-attention neural network layers. During training, a causal mask may be applied to the self-attention neural network layers whilst the self-attention neural network layers are processing the multimodal tokens, e.g., when predicting a next multimodal token in step 514.

In some implementations, the token generation neural network can apply a causal mask to the self-attention neural network layers whilst the self-attention neural network layers are processing the multimodal tokens (e.g., when predicting a next text or audio tokens), i.e., so that at each time step the self-attention neural network layers see only past inputs in a sequence of processed inputs.

In some implementations, the image is generated by a separate model (e.g., the image generation subsystem 104, which, as noted above, may include a diffusion model). As the diffusion model generates an image (rather than a single image token) and all image tokens associated with the image can be passed in parallel to the token generation neural network, bi-directional attention can be used, i.e., with no causal attention mask, whilst the self-attention neural network layers are processing the image tokens during training.

In some implementations, the image generation subsystem may be a diffusion model image generation subsystem, as shown in FIG. 3A for example. In such implementations, using the image generation subsystem to generate a predicted image can comprise sampling a time step from a distribution, generating a noisy version of the training image by adding noise to the training image at a level determined by the time step, the added noise defining a noise image added to the training image, and processing the noisy version of the training image and the time step using the image generation neural network to generate the predicted image.

The predicted image may represent the noise image. The image reconstruction objective can depend on a difference (e.g., a mean square error) between the predicted image and the noise image (or of patches thereof). The predicted image may represent a reconstructed version of the training image. The image reconstruction objective can depend on a difference between the predicted image and the training image.

In general any diffusion model loss can be used. The added noise for a time step can be determined according to a predetermined noise schedule.

In some implementations, the diffusion model may be a latent variable diffusion model. That is, the method can involve generating a noisy version of the training image, or a noisy latent vector representation thereof, by adding noise to the training image or to the latent vector representation thereof, at a level determined by the time step, the added noise defining a noise image added to the training image, or defining a noise latent vector added to the latent vector representation of the training image. The method can also involve processing the noisy version of the training image, or the noisy latent vector representation thereof, and the time step using the image generation neural network to generate the predicted image or a latent vector representation thereof. The predicted image can represent either the noise image or a reconstructed version of the training image; or the noise latent vector or a reconstructed version of the latent vector representation of the training image. The image reconstruction objective can depend on, respectively, either a difference between the predicted image and the noise image, or between the latent vector representation of the predicted image and the noise latent vector; or on a difference between the predicted image and the training image, or between the latent vector representation of the predicted image and the latent vector representation of the training image.

In some implementations the image generation neural network 104, 304 is as described above in relation to FIG. 3A. That is, the image generation neural network 304 has a U-net architecture, e.g., as described above. The U-net architecture has one or more cross-attention neural network layers. Using the image generation subsystem to generate the predicted image conditioned on features representing the subsequence may comprise using the one or more cross-attention neural network layers to attend to features of the subsequence obtained by processing the subsequence using the token generation neural network.

In some implementations the method includes replacing the image generation subsystem comprising the image generation neural network with a second image generating subsystem comprising a second, larger image generation neural network, freezing the learnable parameters of the token generation neural network (and optionally the block encoder if it includes learnable parameters), and training the second, larger (e.g., which includes one or more levels in its U-Net architecture) image generation neural network using further multimodal training examples, each further training example comprising text or audio data and at least one training image, to update learnable parameters of the second, larger image generation neural network. This may provide a computationally cheaper implementation, in which training is performed end-to-end with a smaller diffusion head, and a larger diffusion head trained afterwards on the frozen model.

In some implementations, the above-described methods could be combined with a pre-trained image generation neural network and/or a pre-trained token generation neural network. For example, an existing large pre-trained LLM and Diffusion model could be fine-tuned in this setting.

Example tasks that can be implemented by the system 100 (e.g., after it has been trained) are now described.

In some implementations the method includes, after the training, using the system to perform an audio generation task. In such implementations, the method may include using the system to process a prompt sequence that defines an input sequence of multimodal tokens for the system. The prompt sequence may comprise text or audio that defines the audio generation task. The time series audio data for the audio waveform may define audio that is specified by the prompt sequence. The audio may include spoken words in a natural language.

The method may include using the system, after the training, to perform an image generation task or image processing task. In such implementations, the method may include using the system to process a prompt sequence that defines an input sequence of multimodal tokens for the system, wherein the prompt sequence comprises text or audio that defines an image generation task or image processing task, and wherein the image defines a result of the task.

The task may include generating an image specified by the prompt.

The prompt may include an image. The task may include generating a modified version of the image. A modification to be performed may be described by the prompt.

The prompt may include an image. The task may include an optical character recognition task that involves generating an output sequence of multimodal tokens that represents words or characters in the image.

The prompt may include an image. The task may include generating an output sequence of multimodal tokens that represents an answer to a question about the image.

The prompt may include an image and identifies one or more objects in the image. The task may include generating an output sequence of multimodal tokens that defines a presence, location, orientation, or count of one or more of the objects in the image.

The prompt may include an image. The task may include generating an output sequence of multimodal tokens that describes a content of the image or that classifies a content of the image into one or more of a plurality of categories.

The prompt may include an image and defines a goal for a mechanical agent acting in a real world environment. The task may include generating an output sequence of multimodal tokens that defines one or more actions to be performed by the mechanical agent to achieve the goal. In some implementations, the system is configured to cause the mechanical agent to perform the one or more actions defined by the output sequence of multimodal tokens.

The method may be performed prior to further training to perform the audio generation task. The method may be performed prior to further training to perform the image generation task or image processing task. That is, further training (e.g., fine tuning) may be performed following the training methods described herein.

A few further examples of some machine learning tasks that can be performed by the system 100 trained as described herein follow. In the examples below, where references are made to an image processing task, the task can also be an audio processing task (where appropriate).

In general the prompt sequence can comprise text and/or audio, e.g., speech that defines a task to be performed by the system (after training).

As one example the task may comprise generating an image specified by the prompt. The prompt may specify the content of the image, i.e., it may comprise a description of the image to be generated or (particularly where the prompt includes a still or moving image) the prompt may specify that the image should depict what is predicted to happen next.

As another example the prompt can include an image and the task may involve generating an edited or modified version of the image, where an edit or modification to be performed is described by the prompt. Some example modifications include generating another perspective or view of a subject depicted in the image, e.g., a view from a different angle or a close-up or zoomed out view; or a change in style of the image; or a change in context of the image (e.g., day<

>night; raining< >not raining); and so forth. This may be used to incrementally refine the image.

As another example the prompt can include an image and the task may involve generating an output sequence of multimodal tokens that represents an answer to a question about the image. That is, the prompt may define any visual question answering task; this may involve reasoning about a content of the image.

The prompt may define a query. For example, the system can be used to detect objects in the video frames and provide information relating to the detected objects in response to a query. As another example, in particular where the image is a moving image, such a query may require predictive reasoning ("what will happen next"), counterfactual reasoning ("what would happen in a different circumstance"), explanatory reasoning ("why did something happen"), or causal reasoning generally. The query may comprise, for example, a request for a prediction of a future event or state relating to one or more of the objects (e.g., "will objects X and Y collide?"), or a request for conditional or counterfactual information relating to one or more of the objects (e.g., "what event would [not] happen if object X is modified, moved or absent?"), or a request for analysis of the video frames to determine a property or characteristic of one or more of the objects (e.g., "how many objects of type Z are moving?"). The response may, for example, be in the form of text answer, e.g., a yes/no answer, or may, e.g., define the location of an object, or be in some other format. This can be used to predict whether or not two objects will collide, or how this may be avoided. For example, the system may be used, e.g., to provide a warning and/or to control motion of one or more of the objects.

As another example the prompt can include an image and can identifies, e.g., by text description or in some other way, one or more objects in the image. The task may involve generating an output sequence of multimodal tokens that defines a presence, location (e.g., a bounding box), orientation, or count of one or more of the objects in the image. In implementations of the system, the way that images are encoded (and generated) facilitates tasks that involve processing fine, even pixel-level details of the image. For example, an image in the prompt or generated by the system could, e.g., include a segmentation mask that defines part of the task to be performed.

As another example the prompt can include the prompt includes an image and the task comprises generating an output sequence of multimodal tokens that describes a content of the image, e.g., an image captioning task, or that classifies a content of the image into one or more of a plurality of categories. Where the image is a moving image, this can include action, e.g., gesture, recognition.

As another example the prompt can include an image and defines a goal for a mechanical agent acting in a real world environment, and the task can involve generating an output sequence of multimodal tokens that defines one or more actions to be performed by the mechanical agent to achieve the goal, e.g., a task or sub-task of the mechanical agent, e.g., a mechanical robot.

Some other examples of tasks that may be performed include a text to speech task, where the prompt comprises text in a natural language and the system generates audio for corresponding speech; and a speech to text (speech recognition task), where the prompt comprises audio and the system generates corresponding natural language text.

Some further examples of tasks follow.

As one example the task may comprise an object or action detection task. A training data item may comprise an image or video containing one or more objects or actions, and a sequence of text. The sequence of text may describe or otherwise label the object(s) or action(s) and may include text giving bounding box coordinates for the object(s) or action(s). After training, when the system is used in inference, the system output may comprise or represent text that describes or otherwise labels detected object(s) or action(s) in the image input, and may include bounding-box coordinates for the detected object(s) or action(s), e.g., "10 20 90 100 cat 20 30 100 100 dog".

As another example the task may comprise a classification task, e.g., an object or action classification task. A training data item may comprise an image or video item containing one or more objects or actions and a sequence of text. The sequence of text may describe or otherwise classify the object(s) or action(s). After training, when the system is used in inference, the system output may comprise data, e.g., text, that classifies the object(s) or action(s) in the image input into one of a plurality of classes.

As another example the task may comprise an image or video describing task, e.g., a captioning task (which, as used here, includes an audio description task to explain what is happening in a video). A training data item may comprise an image or video and a sequence of text describing the image or video. After training, when the system is used in inference, the system output may comprise data, e.g., text, describing the image or video. For example, the system output may provide a caption or description, or it may count objects in the image or video, or it may provide some other form of description.

As another example the task may comprise an image or video question-answering task. A training data item may comprise an image or video and a sequence of text that describes the image or video. After training, when the system is used in inference, the system output may comprise data, e.g., text, that answers a question about the input specified in a prompt sequence of text, e.g., as described above. This may be used, e.g., to answer questions about visual plots and charts or about sounds.

As another example the task may comprise a character or word recognition task, e.g., an OCR (optical character recognition) task. A training data item may comprise an image or video and a sequence of text that includes text that is depicted in the image or video, or that is represented as speech in the audio item. After training, when the system is used in inference, the system output may comprise text that represents characters or words, e.g., in a natural language.

As another example the task may comprise a still or moving image generation task; Google DeepMind Gemini is an example of a system that can generate an image output. As another example an image such as a plot or chart may be decoded from one or more (language) tokens generated by the system. A training data item for such a system may comprise an image or video and a sequence of text that describes the image or video. After training, when the system is used in inference, the system output may comprise data for an image or video, e.g., image data defining values for pixels of a still or moving image, and the sequence of text in the multimodal input to the system may describe or characterize the image or video to be generated.

As another example the task may comprise a computer language text generation task. A training data item may comprise an image or video and a sequence of text in a computer language for generating the image or video. After training, when the system is used in inference, the system output may comprise text in the or another computer language for generating or rendering an image or video, e.g., a web page, plot, or chart.

In another example of a computer language text generation task a training data item may comprise an image or video and a sequence of text in a computer language for performing a task in relation to the image or video, e.g., a data processing task that involves analyzing the content of the image or video to provide a result of the analysis or, e.g., a search to search for information relating to the content of the image or video. The computer language in the system output may comprise computer language for invoking a function or calling one or more external APIs. Merely as one example, such an output may be formatted as a JSON object. As previously, a sequence of text in the multimodal input may define the task to be performed and may comprise, e.g., an image or video in relation to which the task is to be performed, e.g., a task that involves manipulation of particular types of data that may benefit from access to an API such as mathematical data, date/time related data, scientific data, recent data that may post-date training of the system (that may be accessed by a search function or API), and so forth. After training, when the system is used in inference, the system output may comprise text in the or another computer language for performing a task, e.g., as described above, in relation to an image or video in the input. The method may then include using the text in the computer language to perform the task.

In general where the system output comprises text this may be provided as speech representing the text.

In some implementations the machine learning task comprises an agent control task in which the agent interacts with an environment to perform the agent control task. In these implementations the multimodal input includes an observation characterizing the environment. For example, the multimodal input can include a sequence of text that defines the task to be performed by the agent and the image can represent an observation of the environment, e.g., captured by a camera or other imaging device from a real-world environment. A training data item may comprise a sequence of text representing one or more actions of the agent, and an image observation of the environment. After training, when the system is used in inference, the system output comprises an action selection output, e.g., including text, that is used to select one or more actions to be performed by the agent in the environment in response to the observation. As an illustration the system output 122 may define an action as text such as "A: 132 114 128 5 25 156", that can be converted into a control signal for a mechanical agent, such as a robot, e.g., "$\Delta T = [0.1, -0.2, 0]$ $\Delta R = [10°, 25°, -7°]$". As another example the action selection output may also or instead define one or more low-level skills, e.g., from a vocabulary of previously learnt skills. As before, the sequence of text in the input to the system may describe the task to be performed, e.g., "What action should the robot take to [perform task]".

In some agent control implementations, the environment is a real-world environment and the agent is a mechanical agent interacting with the real-world environment, e.g., a robot or an autonomous or semi-autonomous land, air, or sea vehicle operating in or navigating through the environment, and the actions are actions taken by the mechanical agent in the real-world environment to perform the task. For example, the agent may be a robot or other mechanical agent interacting with the environment to accomplish a specific task, e.g., to locate or manipulate an object of interest in the environment or to move an object of interest to a specified location in the environment or to navigate to a specified destination in the environment. In these implementations, the observations may include, e.g., one or more of: images, object position data, and sensor data to capture observations as the agent interacts with the environment. The actions may define control signals to control the robot or other mechanical agent, e.g., positions, torques, or other control signals for the parts of the mechanical agent, or higher-level control commands.

In some agent control implementations, the agent may be a human agent and the environment may be a real-world environment. For example, the agent can be a human user of a digital assistant such as a smart speaker, smart display, or some other device that is used to instruct the user to perform actions. The task may be any real-world task that the user wishes to perform. The observations may be obtained from an observation capture subsystem, e.g., a monitoring system such as a video camera or sound capture system, to capture visual observations of the user performing the task. The actions may comprise instructions in the form of, e.g., text, image, video, or audio data such as speech, that guide the user in performing the task.

There are many large training datasets that may be used, e.g., the M3W (MultiModal Massive Web) dataset or the C4 (Colossal Clean Crawled Corpus) dataset, or the WebLI (Web Language Image, Chen, et al., arXiv:2305.18565v1); and/or training data may be obtained from web pages. For example, an updated version of the MultiModal Massive Webdataset. Text and images may be linearized according to position to create interleaved data sequences of image and text. Several filtering steps may be applied, for example non-English documents may be eliminated. Documents lacking images may be discarded. Further text and image filtering heuristics may be applied to remove low-quality documents and reduce repetition. Images that fail specific criteria, such as being too small (either width or height less than 64 pixels), having extreme aspect ratios, or being of low quality (e.g., single-color images), may be removed. Documents without any images after these filters may also be discarded.

Also or instead, smaller but more specialized training datasets can be used, e.g., to train the system for a particular task or tasks. A few examples for visual tasks are the Visual Genome dataset for Visual Question Answering (Krishna, et al., arXiv:1602.07332); Objects365 (Shao, et al., "Objects365: A large-scale, high-quality dataset for object detection", IEEE/CVF international conference on computer vision, pages 8430-8439); Open Images V4 (Kuznetsova et al., arXiv:1811.00982); the SBU dataset (Ordonez, et al., "Im2Text: Describing Images Using 1 Million Captioned Photographs", NeurIPS 2011); the Conceptual Captions datasets, e.g., V1 (2M images) or V2 (10M images) (Sharma, et al., "Conceptual Captions: A Cleaned, Hypernymed, Image Alt-text Dataset for Automatic Image Captioning", ACL 2018); and Kinetics for video (Kay, et al., arXiv:1705.06950). An example task-specific training dataset for audio data is AudioSet (Gemmeke, et al., "Audio set: An ontology and human-labeled dataset for audio events," ICASSP, IEEE, 2017, pp. 776-780). An example task-specific training dataset for agent (robot) control is described in Ebert, et al., arXiv:2109.13396.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them. Thus a system, artificial neural network, or trained artificial neural network as described herein, can be implemented in hardware using electronic circuitry, e.g., in a physical box. Similarly, computer code as described herein can be code to emulate such hardware or code for a hardware description language.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system and can be stored in various ways. This includes being embedded within a file containing other programs or data (e.g., scripts within a markup language document), residing in a dedicated file, or distributed across multiple coordinated files (e.g., files storing modules, sub-programs, or code segments). A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed (or executed) on one computer or on multiple computers, whether located at one site or distributed across multiple sites and interconnected by a data communication network. The specific implementation of the computer programs may involve a combination of traditional programming languages and specialized languages or libraries designed for GPU programming or TPU utilization, depending on the chosen hardware platform and desired performance characteristics.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers. An engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be performed by one or more programmable computers executing one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using special purpose logic circuitry, e.g., an FPGA or an ASIC, or by a combination of special purpose logic circuitry and one or more programmed computers, for even greater performance or energy efficiency in specific use cases.

Computers suitable for the execution of a computer program can be based on general or special purpose microprocessors or both, or any other kind of central processing unit. Generally, a central processing unit will receive instructions and data from a read-only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Computers capable of executing a computer program can be based on general-purpose microprocessors, special-purpose microprocessors, or a combination of both. They can also utilize any other type of central processing unit (CPU). Additionally, graphics processing units (GPUs), tensor processing units (TPUs), and other machine learning accelerators can be employed to enhance performance, particularly for tasks involving artificial intelligence and machine learning. These accelerators often work in conjunction with CPUs, handling specialized computations while the CPU manages overall system operations and other tasks. Typically, a CPU receives instructions and data from read-only memory (ROM), random access memory (RAM), or both. The essential elements of a computer include a CPU for executing instructions and one or more memory devices for storing instructions and data. The specific configuration of processing units and memory will depend on factors like the complexity of the AI model, the volume of data being processed, and the desired performance and latency requirements. Embodiments can be implemented on a wide range of computing platforms, from small embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using a machine learning framework, e.g., a TensorFlow framework or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote (e.g., geographically separated) from each other and typically interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of generating multimodal data using a system comprising a token generation neural network, and an image generation subsystem comprising an image generation neural network, the method comprising:

receiving a prompt sequence that defines an input sequence of multimodal tokens, and processing the input sequence of multimodal tokens using the token generation neural network to generate an output sequence of multimodal tokens, wherein a multimodal token represents a data element of one of a plurality of modalities;

wherein generating the output sequence of multimodal tokens comprises autoregressively, for each successive position in the output sequence of multimodal tokens:

processing a combined sequence comprising the input sequence of multimodal tokens and a current output sequence of multimodal tokens, using the token generation neural network, to generate a next multimodal token for the output sequence of multimodal tokens, and appending the next multimodal token to the current output sequence of multimodal tokens;

the method further comprising, in response to the next multimodal token being a start-of-image token:

generating an image using the image generation subsystem conditioned on features representing the current output sequence of multimodal tokens obtained from the token generation neural network;

processing the image to convert pixels of the image into a sequence of image tokens, each image token comprising a block encoding of values of the pixels in a different region of the image that maps a set of values of the pixels to a respective image token; and appending the sequence of image tokens to the current output sequence of multimodal tokens as the next multimodal tokens in the output sequence of multimodal tokens.

2. The method of claim 1, further comprising continuing to process the combined sequence after appending the sequence of image tokens to the current output sequence of multimodal tokens, to generate further multimodal tokens for the output sequence of multimodal tokens.

3. The method of claim 1, wherein the token generation neural network comprises one or more self-attention neural network layers, the method further comprising using bi-directional attention whilst the self-attention neural network layers are processing the image tokens.

4. The method of claim 1, wherein the input sequence of multimodal tokens comprises multimodal tokens representing text, audio, or image data elements, and wherein the output sequence of multimodal tokens comprises multimodal tokens representing text or audio data elements.

5. The method of claim 1, wherein processing the image to convert pixels of the image into a sequence of image tokens, comprises processing the image to divide the image into a set of regions that tile the image, and determining each image token as a linear projection of the values of the pixels in each respective region.

6. The method of claim 1, wherein the image generation subsystem is a diffusion model image generation subsystem, and wherein generating the image comprises:

initializing the image or a latent vector representation thereof, by sampling values for the pixels of the image or for the latent vector representation from a noise distribution; and at each of a series of time steps: determining an updated version of the image or the latent vector representation thereof, by processing the time step, and the image or the latent vector representation thereof, at the time step, using the image generation neural network conditioned on the features representing the current output sequence of multimodal tokens, to determine a reduced noise version of the image or of the latent vector representation thereof.

7. The method of claim 1, wherein the image generation neural network has a U-net architecture comprising one or more cross-attention neural network layers, and wherein using the image generation subsystem to generate the predicted image conditioned on features representing the current output sequence, comprises:

using the one or more cross-attention neural network layers to attend to features of the current output sequence obtained by processing the current output sequence using the token generation neural network.

8. The method of claim 1, comprising:

processing the combined sequence including the start-of-image token using the token generation neural network to generate features of a summary multimodal token; and wherein generating an image using the image generation subsystem conditioned on features representing the current output sequence of multimodal tokens obtained from the token generation neural network comprises generating the image using the image generation subsystem conditioned on the features of the summary multimodal token.

9. The method of claim 1, wherein the image comprises an audio spectrogram; the method further comprising converting the audio spectrogram to time series audio data for an audio waveform.

10. The method of claim 9, wherein the prompt sequence comprises text or audio that defines an audio generation task; and wherein the time series audio data for the audio waveform defines audio that is specified by the prompt sequence.

11. The method of claim 1, wherein the prompt sequence comprises text or audio that defines an image generation task or image processing task; and wherein the image defines a result of the task; in particular wherein:

i) the task comprises generating an image specified by the prompt;

ii) the prompt includes an image and the task comprises generating a modified version of the image, where a modification to be performed is described by the prompt;

iii) the prompt includes an image and the task is an optical character recognition task that involves generating an output sequence of multimodal tokens that represents words or characters in the image;

iv) the prompt includes an image and the task comprises generating an output sequence of multimodal tokens that represents an answer to a question about the image;

v) the prompt includes an image and identifies one or more objects in the image and the task comprises generating an output sequence of multimodal tokens that defines a presence, location, orientation, or count of one or more of the objects in the image;

vi) the prompt includes an image and the task comprises generating an output sequence of multimodal tokens that describes a content of the image or that classifies a content of the image into one or more of a plurality of categories;

vii) the prompt includes an image and defines a goal for a mechanical agent acting in a real world environment and the task comprises generating an output sequence of multimodal tokens that defines one or more actions to be performed by the mechanical agent to achieve the goal.

12. A computer-implemented method of training a system for generating multimodal data items, the system comprising a token generation neural network, an image generation subsystem comprising an image generation neural network, and a block encoder, the method comprising:

obtaining a set of multimodal training examples, each training example comprising text or audio data and at least one training image and, for each training example:

generating a corresponding sequence of ground truth multimodal tokens representing the text or audio data and the training image, wherein generating the ground truth multimodal tokens representing the training image comprises processing the training image using the block encoder to convert pixels of the training image into a sequence of image tokens, each image token comprising a block encoding of values of the pixels in a different region of the training image that maps a set of values of the pixels to a respective image token; and wherein the sequence of ground truth multimodal tokens includes a start-of-image token before a ground truth multimodal token representing the training image; and determining a plurality of training sequences each comprising a subsequence of the sequence of ground truth multimodal tokens; and for each training sequence:

in response to determining that a last ground truth multimodal token in the subsequence is the start-of-image token, using the image generation subsystem to generate a predicted image conditioned on features representing the subsequence, and processing the subsequence using the token generation neural network to generate a predicted next multimodal token when the last ground truth multimodal token in the subsequence is not the start-of-image token; and training the system based on the training examples using i) an image reconstruction objective that depends on the predicted image and the training image, and ii) a token prediction objective that depends on the predicted next multimodal token and a next ground truth multimodal token after the subsequence, the training including updating learnable parameters of the token generation neural network, and the image generation neural network.

13. The method of claim 12, wherein the multimodal training examples include training examples in which the at least one training image is after the text or audio data and training examples in which the at least one training image is before the text or audio data.

14. The method of claim 12, wherein the training includes updating learnable parameters of the block encoder, and wherein said training includes back propagating gradients of the image reconstruction objective and of the token prediction objective through the token generation neural network into the block encoder to update the learnable parameters of the block encoder.

15. The method of claim 12, wherein the block encoder comprises a linear image region encoding neural network, the method comprising linearly projecting the set of values of the pixels of each region of the training image to a respective image token using the linear image region encoding neural network; and wherein the training comprises back propagating the gradients into the linear image region encoding neural network to update weights of the linear image region encoding neural network.

16. The method of claim 12, wherein using the image generation subsystem to generate a predicted image conditioned on features representing the subsequence, comprises:
processing the training sequence including the start-of-image token using the token generation neural network to generate features of a summary multimodal token; and
using the image generation subsystem to generate the predicted image conditioned on the features of the summary multimodal token.

17. The method of claim 12, wherein the image generation subsystem is a diffusion model image generation subsystem, wherein using the image generation subsystem to generate a predicted image comprises:
sampling a time step from a distribution;
generating a noisy version of the training image by adding noise to the training image at a level determined by the time step, the added noise defining a noise image added to the training image; and
processing the noisy version of the training image and the time step using the image generation neural network to generate the predicted image; and
wherein the predicted image represents either the noise image or a reconstructed version of the training image, and wherein the image reconstruction objective depends on, respectively, either a difference between the predicted image and the noise image, or a difference between the predicted image and the training image.

18. The method of claim 12, wherein the image generation neural network has a U-net architecture comprising one or more cross-attention neural network layers, and wherein using the image generation subsystem to generate the predicted image conditioned on features representing the subsequence, comprises:
using the one or more cross-attention neural network layers to attend to features of the subsequence obtained by processing the subsequence using the token generation neural network.

19. The method of claim 12, further comprising:
replacing the image generation subsystem comprising the image generation neural network with a second image generating subsystem comprising a second, larger image generation neural network;
freezing the learnable parameters of the token generation neural network and the block encoder; and
training the second, larger image generation neural network using further multimodal training examples, each further training example comprising text or audio data and at least one training image, to update learnable parameters of the second, larger image generation neural network.

20. The method of claim 12, wherein generating the corresponding sequence of ground truth multimodal tokens comprises:
inserting the start-of-image token in the sequence before the ground truth multimodal token representing the training image.

21. The method of claim 12,
wherein obtaining the set of multimodal training examples comprises obtaining training examples comprising i) text or first audio data and ii) second audio data, wherein the text or first audio data, and the second audio data, are semantically related; the method further comprising:
converting the second audio data of each training example into an audio spectrogram to obtain the training image for the training example.

22. The method of claim 21, further comprising using the system, after the training, to perform an audio generation task, the method comprising:
using the system to process a prompt sequence that defines an input sequence of multimodal tokens for the system, wherein the prompt sequence comprises text or audio that defines the audio generation task; and wherein the time series audio data for the audio waveform defines audio that is specified by the prompt sequence.

23. The method of claim 12, further comprising using the system, after the training, to perform an image generation task or image processing task, the method comprising:
using the system to process a prompt sequence that defines an input sequence of multimodal tokens for the system, wherein the prompt sequence comprises text or audio that defines an image generation task or image processing task, and wherein the image defines a result of the task; in particular wherein:
i) the task comprises generating an image specified by the prompt;
ii) the prompt includes an image and the task comprises generating a modified version of the image, where a modification to be performed is described by the prompt;
iii) the prompt includes an image and the task is an optical character recognition task that involves generating an output sequence of multimodal tokens that represents words or characters in the image;
iv) the prompt includes an image and the task comprises generating an output sequence of multimodal tokens that represents an answer to a question about the image;
v) the prompt includes an image and identifies one or more objects in the image and the task comprises generating an output sequence of multimodal tokens that defines a presence, location, orientation, or count of one or more of the objects in the image;
vi) the prompt includes an image and the task comprises generating an output sequence of multimodal tokens that describes a content of the image or that classifies a content of the image into one or more of a plurality of categories;
vii) the prompt includes an image and defines a goal for a mechanical agent acting in a real world environment and the task comprises generating an output sequence of multimodal tokens that defines one or more actions to be performed by the mechanical agent to achieve the goal.

24. The method of claim 23, performed prior to further training to perform the image generation task or image processing task.

25. A system comprising:
one or more computers; and
one or more storage devices communicatively coupled to the one or more computers, wherein the one or more storage devices store instructions that, when executed by the one or more computers, cause the one or more computers to perform operations for generating multimodal data using a neural network system comprising a token generation neural network, and an image generation subsystem comprising an image generation neural network, the operations comprising:

receiving a prompt sequence that defines an input sequence of multimodal tokens, and processing the input sequence of multimodal tokens using the token generation neural network to generate an output sequence of multimodal tokens, wherein a multimodal token represents a data element of one of a plurality of modalities;

wherein generating the output sequence of multimodal tokens comprises autoregressively, for each successive position in the output sequence of multimodal tokens:

processing a combined sequence comprising the input sequence of multimodal tokens and a current output sequence of multimodal tokens, using the token generation neural network, to generate a next multimodal token for the output sequence of multimodal tokens, and appending the next multimodal token to the current output sequence of multimodal tokens;

the method further comprising, in response to the next multimodal token being a start-of-image token:

generating an image using the image generation subsystem conditioned on features representing the current output sequence of multimodal tokens obtained from the token generation neural network;

processing the image to convert pixels of the image into a sequence of image tokens, each image token comprising a block encoding of values of the pixels in a different region of the image that maps a set of values of the pixels to a respective image token; and appending the sequence of image tokens to the current output sequence of multimodal tokens as the next multimodal tokens in the output sequence of multimodal tokens.

* * * * *